(12) United States Patent
Bradway et al.

(10) Patent No.: US 8,209,250 B2
(45) Date of Patent: Jun. 26, 2012

(54) SYSTEMS AND METHODS FOR CONDUCTING AN INTERACTIVE FINANCIAL SIMULATION

(75) Inventors: Robert A Bradway, London (GB); Michael Tory, London (GB); Nicolas Turner, London (GB); Simon Smith, London (GB); Wayne W F Woo, London (GB); Thomas Henri Lefebvre, Courbevoie (FR); Stuart Turner, Cambridge (GB); David Rowland, London (GB); Ryan Yap, London (GB)

(73) Assignee: Morgan Stanley, New York, NY (US)

( * ) Notice: Subject to any disclaimer, the term of this patent is extended or adjusted under 35 U.S.C. 154(b) by 1278 days.

(21) Appl. No.: 11/125,442

(22) Filed: May 10, 2005

(65) Prior Publication Data

US 2006/0010057 A1    Jan. 12, 2006

Related U.S. Application Data

(60) Provisional application No. 60/570,000, filed on May 10, 2004.

(51) Int. Cl.
*G06Q 40/00* (2012.01)
(52) U.S. Cl. .................................. 705/36 R; 705/35
(58) Field of Classification Search .................. 705/35, 705/36, 36 R
See application file for complete search history.

(56) References Cited

U.S. PATENT DOCUMENTS

| | | | |
|---|---|---|---|
| 4,522,407 A | 6/1985 | Hatherley | |
| 5,388,836 A | 2/1995 | Foti | |
| 5,692,233 A | 11/1997 | Garman | |
| 6,061,662 A | 5/2000 | Makivic | |
| 6,321,205 B1 | 11/2001 | Eder | |
| 7,089,207 B1* | 8/2006 | Lardy et al. | 705/38 |
| 2002/0111890 A1* | 8/2002 | Sloan et al. | 705/36 |
| 2002/0178105 A1* | 11/2002 | Levine | 705/37 |
| 2003/0046203 A1* | 3/2003 | Ichihari et al. | 705/35 |
| 2004/0078309 A1* | 4/2004 | Norquist et al. | 705/35 |
| 2004/0225593 A1* | 11/2004 | Frankel et al. | 705/37 |
| 2005/0086143 A1* | 4/2005 | Vlazny et al. | 705/35 |
| 2005/0171877 A1* | 8/2005 | Weiss | 705/35 |
| 2005/0187866 A1* | 8/2005 | Lee | 705/39 |
| 2005/0227216 A1* | 10/2005 | Gupta | 434/322 |
| 2006/0064352 A1* | 3/2006 | Paschal | 705/26 |
| 2008/0109351 A1* | 5/2008 | Colaio et al. | 705/39 |

* cited by examiner

*Primary Examiner* — Jagdish Patel
*Assistant Examiner* — Kevin Poe
(74) *Attorney, Agent, or Firm* — K&L Gates LLP

(57) ABSTRACT

A method for conducting an interactive financial simulation. The method is implemented at least in part by a computer and includes transmitting an initial financial projection for a fictitious company, transmitting a news story, generating a new share price for the fictitious company based on an index, generating a new financial projection for the fictitious company based on a set of decisions selected for implementation by a participant of the interactive financial simulation, and generating a final share price for the fictitious company based on a final set of decisions selected for implementation by the participant.

21 Claims, 24 Drawing Sheets

Capital in Peril?

MorganStanley

Activity & Events ▼ Financials

Current Year: 2008
Share Price: €82.09 | Rating: BBB+ | Market Cap: €2.82 Bn

INCOME STATEMENT (€mn)

| | Before* | | 1st Test | | 2nd Test | | 3rd Test | | Final Decision | |
|---|---|---|---|---|---|---|---|---|---|---|
| | 2007E | 2008E | 2007E | 2008E | 2007E | 2008E | 2007E | 2008E | 2007E | 2008E |
| Revenues | | | | | | | | | | |
| - Avionics | 1,217 | 1,230 | 1,217 | 1,230 | | | | | | |
| - Instrumentation [Sold - Litig. on past activ.] | - | - | - | - | | | | | | |
| - Networks [Sold] | - | - | - | - | | | | | | |
| - Wind Power [Incl. Acquired] | 2,956 | 3,285 | 2,956 | 3,285 | | | | | | |
| Total | 4,173 | 4,515 | 4,173 | 4,515 | | | | | | |
| EBITDA | | | | | | | | | | |
| - Avionics | 182 | 184 | 182 | 184 | | | | | | |
| - Instrumentation [Sold - Litig. on past activ.] | - | - | - | - | | | | | | |
| - Networks [Sold] | - | - | - | - | | | | | | |
| - Wind Power [Incl. Acquired] | 275 | 300 | 275 | 300 | | | | | | |
| - Margin / Investment Programmes | 8 | 9 | 16 | 18 | | | | | | |
| Total | 465 | 493 | 473 | 502 | | | | | | |
| % Margin | 11.2% | 10.9% | 11.4% | 11.1% | | | | | | |
| EBIT | 283 | 287 | 291 | 296 | | | | | | |
| Net Int. Exp. | (48) | (48) | (42) | | | | | | | |
| % Gross Interest Cost | 7.7% | 7.7% | 6.7% | | | | | | | |
| EPS (€) | 2.36 | 2.39 | 2.50 | | | | | | | |
| Accretion/(Dilution) | | | 5.9% | | | | | | | |
| FREE CASH FLOW | (17) | 13 | (7) | | | | | | | |
| EBITDA / Net Interest Expense | 9.8x | 10.4x | 11.2x | | | | | | | |

CURRENT CAPITAL STRUCTURE (estimate at Dec 2006)

| | | | | | | | | | | |
|---|---|---|---|---|---|---|---|---|---|---|
| Immediate Funding Need (net of cash/one-off charges) | 203 | | 200 | | | | | | | |
| Short-term Debt (due at end of next year) | 200 | | 200 | | | | | | | |
| Medium-term Debt (matures between 1 & 2 years) | 200 | | 200 | | | | | | | |
| Long-term Debt (matures > 2 years) | - | | 300 | | | | | | | |
| Total Debt | 663 | | 700 | | | | | | | |
| Less: Cash | (200) | | (236) | | | | | | | |
| Net Debt / (Cash) | 463 | | 463 | | | | | | | |
| Available Headroom Under Bank Loans | | | | | | | | | | |
| Net Debt / 2007E EBITDA | 1.0x | | 1.0x | | | | | | | |
| Shareholders' Equity | 2,740 | | 2,740 | | | | | | | |

*Assumes debt coming due is refinanced with instruments at similar terms

SYSTEMS AND METHODS FOR CONDUCTING AN INTERACTIVE FINANCIAL SIMULATION

CROSS-REFERENCE TO RELATED APPLICATION

This application claims the priority benefit of U.S. Provisional Application No. 60/570,000, which was filed on May 10, 2004 and is incorporated by reference in its entirety.

BACKGROUND

This application discloses an invention that is related, generally and in various embodiments, to systems and methods for conducting an interactive financial simulation.

SUMMARY

In one general respect, this application discloses a method for conducting an interactive financial simulation. According to various embodiments, the method is implemented at least in part by a computer, and includes the following: transmitting an initial financial projection for a fictitious company, transmitting a news story, generating a new share price for the fictitious company based on an index, generating a new financial projection for the fictitious company based on a set of decisions selected for implementation by a participant of the interactive financial simulation, and generating a final share price for the fictitious company based on a final set of decisions selected for implementation by the participant.

In another general respect, this application discloses a system for conducting an interactive financial simulation. According to various embodiments, the system includes a server. The server includes a financial module for generating financials of a fictitious company, and a simulation module for directing the interactive financial simulation associated with the fictitious company.

BRIEF DESCRIPTION OF THE DRAWINGS

FIGS. 3-24 illustrate various embodiments of screen shots.

DETAILED DESCRIPTION

Figure 1:
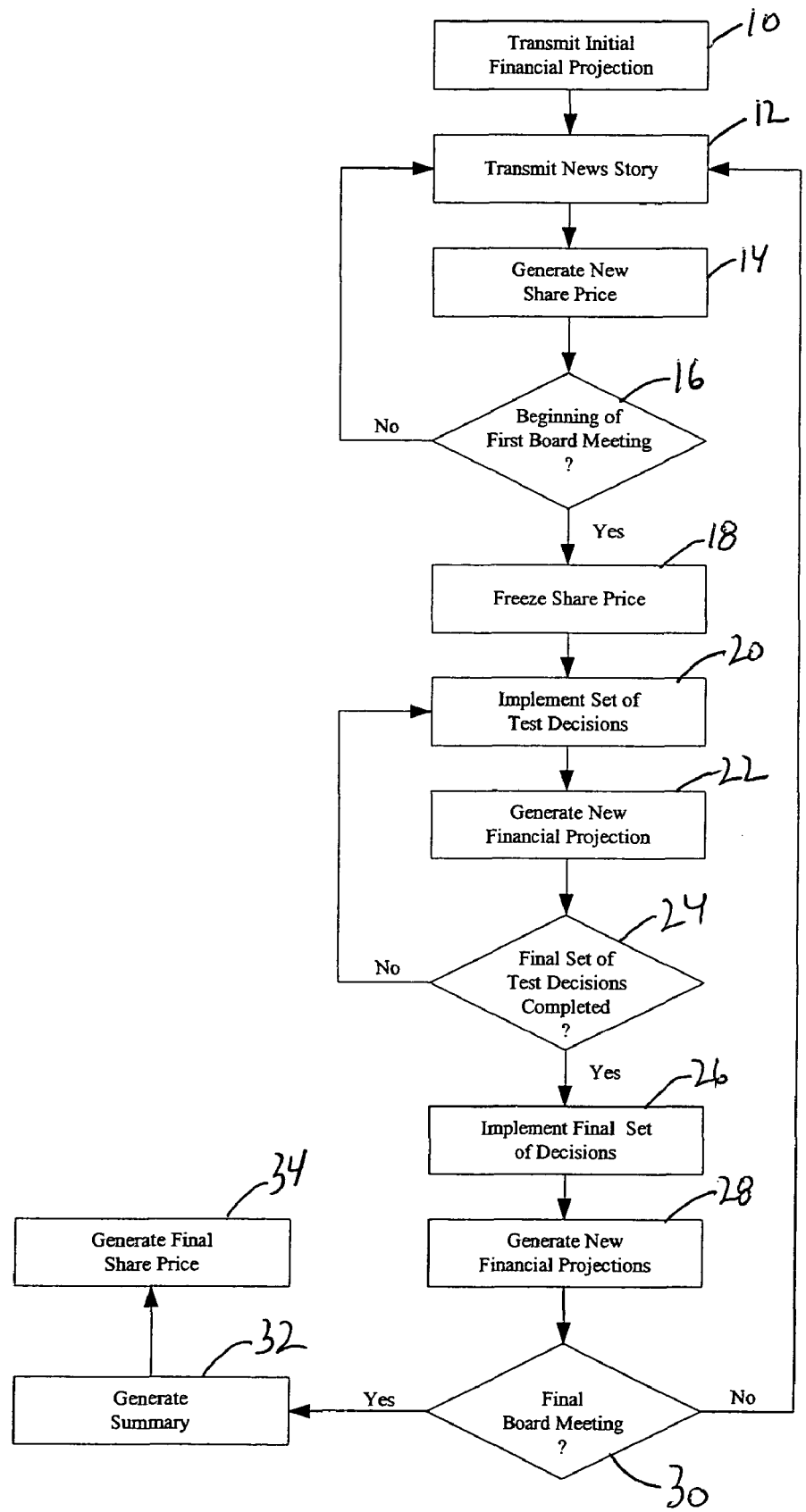
FIG. 1 illustrates various embodiments of a method for conducting an interactive financial simulation.

The methods and systems described herein may be utilized to educate and train personnel. It is to be understood that the figures and descriptions of the disclosed invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein.

In one general respect, this application discloses various embodiments of a method for conducting an interactive financial simulation. According to various embodiments, the method comprises conducting a capital structure and Merger and Acquisition focused financial simulation. The simulation may be implemented as an interactive role-playing exercise structured and arranged to educate and train people who participate in the simulation. The participants may include any number of individuals, any number of teams comprising any number of individuals, or any combination thereof. The simulation may be conducted as a game where the participants compete with one another to maximize the share price of a fictitious company.

According to various embodiments, prior to the start of the simulation, each participant may be provided with background information concerning the basic rules and structure of the simulation. The background information may be provided in written or electronic form. Each participant may receive an overview that outlines the game play and basic rules according to various embodiments of the simulation. For example, according to various embodiments, the following overview may be provided to participants organized as teams:

1) Up to 10 teams will participate in the simulation.
2) Each team will start the simulation as the new board of directors for a fictitious Industrials company.
3) Each team will start the simulation managing the same company. The only distinguishing factor is the company name for each of the teams. Therefore, each team will have the same starting point.
4) The simulation will last for a period of 5 simulated years. The first year will be equivalent to 25 minutes of real time and the other years will be equivalent to twenty minutes of real time. The extra time in the first year is to give the participants more time to become accustomed to the mechanics of the simulation.
5) Each year will be split into 6 minutes of news flow and a 14 minute board meeting, except for the first year where the board meeting will last for 19 minutes. During a given board meeting, each team may make a management decision based on a future strategy, news flow that period, and any previous decisions made.
6) The winner of the simulation will be the team having the highest company share price at the end of the game. Thus, each team should operate to maximize company share price over the course of the simulation.
7) During each board meeting, a board meeting agenda will be presented to each team to help facilitate key discussions for that year.
8) During the board meetings, each team may test the impact of their decisions against their company's financials to assess the wisdom of selecting such decisions for implementation.
9) During each board meeting, each team may test up to three decisions before selecting a final decision to be implemented.
10) The decisions available to each team are dynamic and will depend on previous decisions, the particular period and the current financial status of the company.
11) If no final decision is selected to be implemented during a board meeting, the team will be deemed to have selected a "no decision" and the company share price will be affected according to market conditions.
12) Prior to revealing their final decisions at the end of the simulation, each team will be asked to prepare a statement to explain their strategy and decision making process. Several teams will then be asked to present their strategy to the rest of the participants.
13) At the end of the fifth year, the closing company share prices of the various teams will be revealed to all the participants. The closing company share prices will be revealed from lowest to highest.

It will be appreciated by one skilled in the art that the exemplary overview described above may be varied according to other embodiments. For example, the participants may be provided with more detailed preliminary information concerning the simulation. Such preliminary information may include a description of the general themes covered in the simulation. According to various embodiments, the general themes may include the following:

1) Company restructuring or transformation, focusing both on the company portfolio of activities and branches and on the company's capital structure.
2) Implementation of company strategy given changing market environments and incomplete information.
3) Internal corporate growth strategies versus external corporate growth strategies.

The preliminary information provided to the participants prior to the start of the simulation may also include a more detailed overview of the simulation. According to various embodiments, the following overview may be provided to the participants.

1) At the beginning of the simulation, each team is appointed to the board of a fictitious multi-division company. All teams start with exactly the same company and are provided with materials to read and learn about the current state and future prospects of this company.
2) Throughout the simulation, each team's company will experience the same exogenous and endogenous events, brought to the teams' knowledge through written publications and simulated televised news bulletins.
3) At various points in time, the teams have the possibility to act on their respective companies and, as corporate actions are taken, the profile of each company changes. Teams have to use scenario planning in order to prepare for negative consequences and take advantage of opportunities that these events and news stories create for their company.
4) Each team is therefore requested to take financial and strategic decisions affecting the financial situation of the company they are in charge of, its prospects and the way the fictitious market in which all the companies evolve values this company.
5) An index fluctuates continuously to reflect the state of the economy underlying the market.
6) Continuously, depending on the spot level of the index, on the company's financials and on the strategy implemented by each team, an automated financial model will attribute a share price and a credit rating to each company.
7) The winning team is the one running the company with the highest share price at the end of the simulation, irrespective of its credit rating. Therefore, each team should operate to maximize their companies' share prices over the long-term. Aside from this competitive dynamic, there are no other interactions between participating teams.
8) Teams may be required to analyze and justify their decision-making processes to fictitious shareholders.

The preliminary information provided to the participants prior to the start of the simulation may also include generally accepted business principles that are useful to consider when the teams select decisions to be implemented. According to various embodiments, the following generally accepted business principles may be provided to the participants.

1) Companies that act early to address financial needs generally outperform companies that act later, even despite some short term negative reactions.
2) The appropriateness of capital structure is based on many factors. For example, the appropriateness of capital structure may be considered with respect to any one or more of the following:
   a) Debt to equity mix;
   b) Duration, liquidity to market risk;
   c) Diversification of risk;
   d) Choice of currency for debt raising; and
   e) Choice of appropriate funding instrument depending on cost.
3) Debt should be pre-funded when possible and at the lowest cost.
4) Companies are penalized for letting cash "sleep" in their books.
5) Once a capital crisis is encountered, rebuilding debt and equity markets creditability is difficult and takes time.
6) Equity and debt markets are increasingly linked.
7) Pay attention to credit rating vs. share price.
8) Trading one's way out of a fundamental capital structure problem is usually unsuccessful.
9) Testing capital structure under different scenarios helps decision making.
10) The reward or penalty for aggressive risk depends on market conditions.
11) Carefully consider between assets to be sold.

The preliminary information provided to the participants prior to the start of the simulation may also include a general description of the playing process. According to various embodiments, the following general description of the playing process may be provided to the participants.

1) The financial situation of the company is defined by its accounts (e.g., income statement, balance sheet and cash flow statement). For each company, the financial situation is projected out for a simulated period of nine to twelve years based on reasonable market assumptions and depending on the theme chosen for any specific instance of the simulation.
2) At the beginning of the simulation, all the teams take control of exactly the same company. Therefore, each team starts with the same financial situation, the same share price and the same credit rating.
3) The simulation lasts for five periods (each period represents a fictitious financial year), during which the index evolves depending on market news presented to all the teams at the same time via, for instance, a main fictitious television program that all participants can watch or listen to. The news can be presented by any suitable mechanism including video, text only, ticker, etc.
4) At the end of each financial year, the fictitious clock is frozen, the index stops fluctuating and each team has a certain lapse of time to think about the strategy it wants to implement for its company. This collective brainstorming and decision point is known as the board meeting. It happens at the same time for all the teams, five times during the game at the end of each fictitious financial year.
5) When a board meeting starts, each team has access to the pre-decisions income statement forecasts for the two years to come and to the balance sheet projection for the current financial year. For instance, supposing that the current fictive year is 2006, the team will be able to look at the pre-decisions income statement forecasts for their company at the end of 2007 and 2008 and at what the balance sheet will look like at the end of 2006 should they not take any decision. The access may be via, for example, a computer interface a team can use that is not shared with the other teams.

6) During a board meeting, each team has the opportunity to choose up to three decisions in amongst a panel of pre-set decisions that they will be able to apply to the company. According to various embodiments, up to eighteen different options can be proposed at each board meeting. In order to help the thought process and enhance the decision-making ability of the teams, each team is allowed to test the impact of three different sets of decisions on the income statement and the balance sheet of the company before the team members make up their mind as to what decision they want to have implemented.

7) After each test, the team can see the impact of the test on the income statement forecasts for the two years to come and to the balance sheet projection for the current financial year. They can compare those financial statements with the pre-decision financial statements, and compare the tests between one another. This helps the team members to decide which set of decisions will best help their team increase their company share price.

8) At each board meeting, the team has to submit its final set of decisions before the time allotted for the board meeting ends. As soon as the board meeting ends, the simulation enters into the following year, a new share price and credit rating are attributed to the company and the index starts to fluctuate again.

9) The credit rating of the company reflects its solvency position. It notably has an impact on how expensive borrowing debt is for the company. This credit rating will only change after each board meeting and will remain constant throughout a given financial year.

10) The share price reflects various factors such as, for example, strategy and capital structure. Due to the constant evolution of the index throughout the financial year and to the link between the share prices and the index, the share prices of the different teams do not remain constant throughout a financial year. It is possible for one team to overtake another team between board meetings, without the change in rank being the instantaneous result of decisions made at the most recent board meeting, simply because the financial structure of the one team gives its share price a better momentum than its competitors'.

The preliminary information provided to the participants prior to the start of the simulation may also include a general description of the theory behind the simulation. According to various embodiments, the following general description of the theory behind the simulation may be provided to the participants.

The team having the highest company share price at the end of the simulation is deemed to be the winner of the game. The theory behind having the teams maximize their company's share price to win the game is the concept that share price represents one of the best measures of a company's fair value under efficient market theory. The concept is based on the belief that market prices reflect the knowledge and expectations of all investors because information is equally available to all investors.

Ratios are often used to assess a company's value relative to the profits it generates. For example, a commonly used ratio is the P/E ratio (share price divided by net earnings per share). One can compare a company's P/E ratio with that of its peers to assess whether a company's share price is high relative to the net earnings per share it generates. For example, Company A may have a share price of 100 whereas Company B has a share price of 200. If one looks only at the absolute share prices, Company B appears to be more valuable than Company A. However, if Company A generates net earnings per share of 10 and Company B generates net earnings per share of 20, then both companies would have P/E ratios of 10× implying that they are equally valuable relative to the net earnings that they generate.

Although P/E is one of the most traditional and most frequently used ratios, there are many other types of ratios that investors use to analyze the value of companies relative to the earnings they generate. The share price and P/E ratio are merely measures of value. According to various embodiments, the fundamental drivers of a company's value, and consequently drivers of share price and P/E ratio, used in the simulation can be largely categorized into the following:

1) Capital Structure;
2) Growth;
3) Profitability; and
4) Strategy.

Capital structure represents the financial framework of a company. In other words, capital structure represents how a company is funded. In every company, funding is required to support its operations. For example, for a high street retail company funding is required to buy or lease the premises on the high street, pay salaries to staff, buy goods to sell to customers, etc. There are two main forms of funding: debt and equity. Both forms of funding have certain advantages and disadvantages.

Funding is available to companies at a cost. For example, one cost may be interest payments on debt. The cost of debt is generally lower than that of equity, largely due to the tax shield on debt because interest payments on the debt are often tax deductible. However, a significant amount of debt could potentially represent a high risk for a company as interest payments associated with debt have to be paid on time. A deterioration in business performance may cause a company to default on its interest payments, thereby putting the company at risk of bankruptcy. In contrast, divided payments on equity are paid on a voluntary basis, as determined by the company. A significant amount of debt may also place various operational restrictions on a company, depending on the lending agreement. For example, many lending agreements include a debt covenant that requires that a company's debt coverage ratio (a measure of debt divided by profitability) does not exceed a certain amount.

The correct capital structure therefore depends on the individual characteristics and risk profile of the company and the strategy of its management team. A common way to assess the mixture between debt and equity is to use credit ratings and credit ratios. Credit ratings are determined based on a qualitative assessment of the company (e.g. growth, profitability, strategy, etc.) as well as credit ratios. Credit ratios are statistics that reveal a company's capital structure. For example, the debt coverage ratio referenced hereinabove is a credit ratio. Other examples of credit ratios include interest coverage ratio (a measure of profitability divided by size of interest payments associated with debt) and leverage ratio (debt funding expressed as a percentage of equity funding).

However, the simulation includes several different funding alternatives within the categories of debt and equity. Accordingly, there are many matters that one should consider in relation to debt funding. For example, one should consider long-term vs. short-term, large vs. small, cheap vs. expensive, restrictive or unrestrictive covenants, etc. The correct mixture of funding again depends on the individual characteristics and risk profile of the company and the strategy of its management team. It needs to strike the correct balance between achieving a lower cost of funding through debt, the timing related to repayment and the risk associated with default.

Capital structure is captured in the simulation's share price predictor methodology by assessing the company's strategy and credit ratios at any point in time and adjusting the P/E ratio accordingly. In times of a bull market, the share price predictor methodology assumes investors attribute greater value to companies with strong growth and strategy, but in times of a bear market, investors become more risk averse and attribute greater value to companies with more risk adverse capital structure.

As stated above, growth is one of the fundamental drivers of a company's value in the simulation. With sufficient funding, a company often aims to grow in order to increase scale. Based on a constant P/E multiple, growth in earnings would naturally imply growth in value. Growth is captured in the simulation's share price predictor methodology by applying the P/E multiple to forward year's net earnings per share, rather than current year's net earnings per share.

As stated above, profitability is one of the fundamental drivers of a company's value in the simulation. Profitability may follow logically from growth. A company may grow, but the growth would not be translated into value based on the P/E methodology unless the business is profitable. Profitability is often measured by profit margin, calculated as profit divided by revenues. Therefore, growth is translated into value only when net earnings per share increase. For example, a restaurant may grow revenues by offering a special promotional discount on meals. However, although revenues may increase, the promotional discount may negatively impact profitability if less profit is earned for all new meals sold due to the promotional discount. Revenues would therefore be lower relative to profit, and the profit margin would decline. Profitability is inherently captured in the simulation's share price predictor methodology because net earnings are by definition a measure of profitability.

As stated above, strategy is one of the fundamental drivers of a company's value in the simulation. Strategy is a non-specific term that effectively describes the policy and direction that a company plans for. During the simulation, a company can expand in a new high growth potential business or consolidate in areas where it already has a strong position. Strong market positions evidenced by, for example, a leading market share, are perceived as advantageous because it is likely that the company would enjoy operating benefits such as greater pricing power, better contractual terms, etc. A company can also diversify into many businesses or focus only on one industry sector. A well diversified company is perceived positively because it diversifies itself from a concentration of risk in any one sector. However, a company that is too diversified may be perceived negatively because it may have disparate management that lacks the focus required to execute the management plan.

Management teams have the freedom to implement the strategy that they believe to be in the best interests of the company. The flexibility they enjoy in doing so is somewhat dependant on the restrictions imposed by their capital structure. A company with extraordinarily high leverage would therefore be perceived poorly as it is likely to be subject to more restrictive covenants. Strategy is captured in the simulation's share price predictor methodology because the P/E ratio is adjusted accordingly to reflect the nature of diversification, capital structure and market position in which the company operates.

Accordingly, the teams need to adopt a strategy that strikes a fine balance between capital structure, growth and profitability to maximize company value by maximizing share price. This strategy needs to be sufficiently robust to withstand any shocks and suitably flexible to take advantage of any opportunities presented by the fictional events and televised news stories presented to the teams during the simulation.

FIG. 1 illustrates various embodiments of the process flow of the simulation. The process starts at block 10, where the initial financial projections are transmitted to the participants. The initial financial projections may be presented to the participants via a display and may include, for example, the starting share price, the starting credit rating, the current market capitalization, and the immediate funding requirements.

The financials of the company (income statement, balance sheet and cash flow statement) are determined by a financial model. The financial model may be designed, for example, in Microsoft Excel. The financial model determines the share prices once per actual real time minute and determines the credit ratings once per fictitious financial year. The financial model may comprise an investment banking dynamic model enhanced by a set of Visual Basic for Applications macros that enable the financial model to respond to the choices the teams make at each board meeting. According to various embodiments, there is one financial model per team, and the structure of the financial model is the same for each team. Of course, as time goes by and teams take different decisions during the board meetings, the figures in the financial model of one team can become very different from the figures in the financial model of another team.

A description of the structure of the financial model according to various embodiments is set forth below. The fictitious company may comprise four divisions: Division 1, Division 2, Division 3 and Division 4. For explanatory purposes, 2004 will be considered the fictitious fiscal year the simulation starts. The financial model may include a spreadsheet for each of the four divisions. The spreadsheets may be embodied as Excel spreadsheets and may be referenced as Divison1Financials, Division2Financials, Division3Financials and Division4Financials. Each of these spreadsheets may comprise a simplified income statement, a simplified cash flow statement and a single line balance sheet.

The simplified income statement may include, for example, the following categories: revenues, EBIDTA (earnings before interest, depreciation, tax and amortization), depreciation and amortization, EBIT (earnings before interest and tax), tax, and unlevered net income.

The revenues figures of the simplified income statement may include fictitious "actual" figures for 2002 and 2003, and projections for the years 2004-2012. Revenues growth is a driver of the company's value. According to various embodiments, for every year "n" of the 2004-2012 period, a growth rate "$g_n$" has been set and the revenues for year "n" are derived from the previous year's revenues by the following equation:

$$\text{Revenues}_n = \text{Revenues}_{(n-1)} \times (1 + g_n)$$

The EBITDA figures of the simplified income statement may include fictitious "actual" figures for 2002 and 2003, and projections for the years 2004-2012. EBITDA margin or EBITDA as a percentage of revenues is a driver of the company's value. According to various embodiments, for every year "n" of the 2004-2012 period, an EBITDA margin "$m_n$%" has been set and the EBITDA for year "n" is derived from the current year's revenues by the following equation:

$$\text{EBITDA}_n = \text{Revenues}_n \times m_n\%$$

The depreciation and amortization figures of the simplified income statement may include fictitious "actual" figures for 2002 and 2003, and projections for the years 2004-2012.

Depreciation and amortization (D&A) as a percentage of revenues is a driver of the company's value. According to various embodiments, for every year "n" of the 2004-2012 period, a D&A percentage of revenues "$p_n$ %" has been set and the D&A for year "n" is derived from the current year's revenues by the following equation:

$$D\&A_n = -\text{Revenues}_n \times p_n \%$$

The EBIT figures of the simplified income statement may include fictitious "actual" figures for 2002 and 2003, and projections for the years 2004-2012. The EBIT is obtained by adding D&A (usually negative) to EBITDA in any given year. According to various embodiments, for every year "n" of the 2004-2012 period, the EBIT is determined by the following equation:

$$EBIT_n = EBITDA_n + D\&A_n$$

The tax figures of the simplified income statement may include fictitious "actual" figures for 2002 and 2003, and projections for the years 2004-2012. The tax rate is a driver of a company's value. According to various embodiments, the tax rate is kept constant and equal for each division. At the divisional level, debt is not taken into account, the divisions do not pay any interests, and the yearly tax amount for each division may be calculated on the basis of the EBIT. When the EBIT is negative, tax may be set to zero. According to various embodiments, for every year "n" of the 2004-2012 period, if the tax rate is "t", the tax figure is determined by the following equation:

$$Tax_n = \text{maximum}[0, -EBIT_n \times t]$$

The unlevered net income figures of the simplified income statement may include fictitious "actual" figures for 2002 and 2003, and projections for the years 2004-2012. The unlevered net income figures are obtained by adding tax (negative) to EBIT in any given year. According to various embodiments, for every year "n" of the 2004-2012 period, the unlevered net income is determined by the following equation:

$$\text{Unlevered net income}_n = EBIT_n + tax_n$$

The simplified cash flow statement may include, for example, the following categories: EBITDA, tax, capital expenditure or net investments in long term assets, and unlevered free cash flow. The EBITDA figures of the simplified cash flow statement are directly linked to the EBITDA figures in the simplified income statement for every year of the 2002-2012 period. Similarly, the tax figures of the simplified cash flow statement are directly linked to the tax figures in the simplified income statement for every year of the 2002-2012 period.

For the capital expenditure (Capex) figures of the simplified cash flow statement, capex as a percentage of revenues is a driver of the company's value. According to various embodiments, for every year "n" of the 2004-2012 period, a capex percentage of revenues "$q_n$ %" has been set and the capex for year "n" is derived from the current year's revenues by the following equation:

$$Capex_n = -\text{Revenues}_n \times q_n \%$$

Generally, this capex percentage of revenues has been made equal to the D&A percentage of revenues, but not for all divisions. For those divisions that need to massively invest, capex is generally higher in absolute value than D&A.

The unlevered free cash flow figures of the simplified cash flow statement may include fictitious "actual" figures for the years 2002 and 2003, and projections for the years 2004-2012. For purposes of simplicity, the unlevered free cash flow figures are obtained by adding tax and capex (usually both negative) to EBITDA in any given year. According to various embodiments, for every year "n" of the 2004-2012 period, the unleveraged free cash flow is determined by the following equation:

$$\text{Unlevered free cash flow}_n = EBITDA_n + Tax_n + Capex_n$$

The single line balance sheet may include a category designated as Book Value. The book value figures may include fictitious "actual" figures for 2002 and 2003, and projections for the years 2004-2012. For reasons of simplicity, the book value figures are obtained by adding the current year's unlevered net income to the previous year's book value. Therefore, the 2003 book value has been set to a certain level and for every year "n" of the 2004-2012 period, the book value is defined by the following equation:

$$\text{Book value}_n = \text{Book value}_{(n-1)} + \text{Unlevered net income}_n$$

For each division, as the simulation starts (in financial year 2004) a first pre-defined set of drivers ($g_n$, $m_n$ %, $p_n$ %, t, $q_n$ %) is used for each financial year "n" between 2004 and 2012 and meant to reflect the expectations of the market on the division for the years to come, depending on the state of the economy and the specific industry the division evolves in.

When the simulation gets into financial year 2005 (the second period), a second pre-defined set of drivers ($g_n'$, $m_n'$ %, $p_n'$ %, t, $q_n'$ %) is used for each financial year "n" between 2005 and 2012 and meant to reflect the new expectations of the market on the division for the years to come. This new set of drivers is pre-defined and does not dependent on the decisions made by the team. The drivers for 2004 are from then on fixed to whatever they were in the previous set.

When the simulation gets into financial year 2006 (the third period), a third pre-defined set of drivers ($g_n''$, $m_n''$ %, $p_n''$ %, t, $q_n''$ %) is used for each financial year "n" between 2006 and 2012. This new set of drivers is pre-defined and does not dependent on the decisions made by the team. The drivers for 2005 are from then on fixed to whatever they were in the previous set.

When the simulation gets into financial year 2007 (the fourth period), a fourth pre-defined set of drivers ($g_n'''$, $m_n'''$ %, $p_n'''$ %, t, $q_n'''$ %) is used for each financial year "n" between 2007 and 2012. This new set of drivers is pre-defined and does not dependent on the decisions made by the team. The drivers for 2006 are from then on fixed to whatever they were in the previous set.

When the simulation gets into financial year 2008 (the fifth period), a fifth pre-defined set of drivers ($g_n''''$, $m_n''''$ %, $p_n''''$ %, t, $q_n''''$ %) is used for each financial year "n" between 2008 and 2012. This new set of drivers is pre-defined and does not dependent on the decisions made by the team. The drivers for 2007 are from then on fixed to whatever they were in the previous set.

The spreadsheets for the four divisions may be consolidated in a group spreadsheet that presents the consolidated financials of the combined entity of the four divisions. These financials give a view of the company's status and prospects without taking into consideration any decision taken by the team during the board meetings, and evolve year-by-year only because of the change in drivers $g_n$, $m_n$ %, $p_n$ %, t, $q_n$ % in the different divisions of the company.

As is the case for the division spreadsheets, the group spreadsheet may be embodied as an Excel spreadsheet and may comprise a simplified income statement, a simplified cash flow statement and a single line balance sheet. The group spreadsheet may also include a debt schedule. The debt schedule contributes to the dynamicity of the financial model and allows for certain tranches of debt to be repaid when cash is generated in excess of what is needed to run the company.

The simplified income statement of the group spreadsheet may include, for example, the following categories: revenues, EBIDTA, depreciation and amortization, EBIT, net interest expense, profit before tax (PBT), tax, and unlevered net income.

The revenue figures of the simplified income statement may include figures for the years 2002 to 2012. According to various embodiments, for each year and in each period of the simulation, the consolidated revenues are equal to the sum of the revenues for Division 1, Division 2, Division 3 and Division 4.

The EBITDA figures of the simplified income statement may include figures for the years 2002 to 2012. According to various embodiments, for each year and in each period of the simulation, the consolidated EBITDA figure is equal to the sum of the EBITDA figures for Division 1, Division 2, Division 3 and Division 4.

The D&A figures of the simplified income statement may include figures for the years 2002 to 2012. According to various embodiments, for each year and in each period of the simulation, the consolidated D&A figure is equal to the sum of the EBITDA figures for Division 1, Division 2, Division 3 and Division 4.

According to various embodiments, for each year and in each period of the simulation, the consolidated EBIT figure of the simplified income statement is equal to the sum of the EBIT figures for Division 1, Division 2, Division 3 and Division 4.

The net interest expense figures of the simplified income statement are determined by the debt schedule as described hereinbelow.

The PBT figures of the simplified income statement are obtained by adding net interest expense (usually negative) to the consolidated EBIT in any given year. According to various embodiments, for every year "n" of the 2004-2012 period, the consolidated PBT figures may be determined by the following equation:

$$PBT_n = EBIT_n + \text{Net interest}_n$$

The tax figures of the simplified income statement are not merely the sum of the tax figures for Division 1, Division 2, Division 3 and Division 4. As is the case with the divisions, the tax rate is a driver of the company's value. For purposes of simplification, when the PBT is negative, the tax figure may be set to zero. According to various embodiments, for every year "n" of the 2004-2012 period, if the tax rate if "t", the consolidated tax figure may be determined by the following equation:

$$Tax_n = \text{maximum}[0, -PBT_n \times t]$$

The unlevered net income figures of the simplified income statement are obtained by adding the tax figure to the PBT figure in any given year. According to various embodiments, for every year "n" of the 2004-2012 period, the consolidated unlevered net income figure may be determined by the following equation:

$$\text{Net income}_n = PBT_n + Tax_n$$

The simplified cash flow statement of the group spreadsheet may include, for example, the following categories: EBITDA, tax, net interest expense, operating cash flow, capex, free cash flow, mandatory repayments and cash flow post mandatory non-operational payments.

The EBITDA figures of the simplified cash flow statement are directly linked to the consolidated EBITDA figures in the simplified income statement for every year of the 2002-2012 period.

The tax figures of the simplified cash flow statement are directly linked to the consolidated tax figures in the simplified income statement for every year of the 2002-2012 period.

The net interest expense figures of the simplified cash flow statement are directly linked to the net interest expense figures in the simplified income statement for every year of the 2002-2012 period.

For purposes of simplification, the operating cash flow figures of the simplified cash flow statement are obtained directly by adding the consolidated tax figure and the net interest expense figure (both generally negative) to the consolidated EBITDA figure in any given year. According to various embodiments, for every year "n" of the 2004-2012 period, the operating cash flow may be determined by the following equation:

$$\text{Operating cash flow}_n = EBITDA_n + Tax_n + \text{Net interest expense}_n$$

The capex figures of the simplified cash flow statement may include the capex figures for the years 2002 to 2012. According to various embodiments, for each year and in each period of the simulation, the consolidated capex figures are equal to the sum of the capex figures for Division 1, Division 2, Division 3 and Division 4.

For purposes of simplification, the free cash flow figures are obtained directly by adding the capex figure (generally negative) to the operating cash flow figure in any given year. According to various embodiments, for every year "n" of the 2004-2012 period, the free cash flow figures may be determined by the following equation:

$$\text{Free cash flow}_n = \text{Operating cash flow}_n + Capex_n$$

The mandatory repayments figures of the simplified cash flow statement are obtained directly by adding together the mandatory repayment figures for all the debt tranches listed in the debt schedule described hereinbelow. According to various embodiments, maturing debt tranches are directly refinanced through a revolver debt facility listed in the debt schedule and are not taken into account under the mandatory repayment category of the simplified cash flow statement.

For purposes of simplification, the figures for the cash flow post mandatory non-operational payments are obtained directly by adding the mandatory debt repayments figures (negative) and mandatory one-off movements (negative) such as litigation fines, pension contributions, etc. to the free cash flow figures in any given year. According to various embodiments, for every year "n" of the 2004-2012 period, the figure for the cash flow post mandatory non-operational payments may be determined by the following equation:

$$\text{Cash flow post mandatory non-operational payments}_n = \text{Free cash flow}_n - \text{Mandatory debt repayment}_n - \text{Mandatory one-off movements}_n$$

The simplified balance sheet of the group spreadsheet may include, for example, the following categories: Book Value, Cash, Debt, and Net Debt. For purposes of simplicity, the book value of the simplified balance sheet is obtained directly by adding to the previous year's book value the current year's unlevered net income. According to various embodiments, the consolidated book value for 2003 is equal to the sum of the book values for Division 1, Division 2, Division 3 and Division 4 in 2003 and for every year "n" of the 2004-2012 period, the book value is then defined by following equation:

$$\text{Book value}_n = \text{Book value}_{(n-1)} + \text{Unlevered net income}_n$$

The cash figures of the simplified balance sheet and the debt figures of the simplified balance sheet are determined by the debt schedule as described hereinbelow. The net debt figures for the simplified balance sheet are obtained by subtracting the cash figure from the debt figure in any given year. According to various embodiments, for every year "n", the net debt figure is determined by the following equation:

$$\text{Net debt}_n = \text{Debt}_n - \text{Cash}_n$$

The debt schedule of the group spreadsheet may include, for example, the following categories: cash available for yearly requirements, revolver debt, debt tranches, maturing facilities, cash, interest expense, interest income, litigation fines and pension contributions.

According to various embodiments, a minimum cash requirement is generally forced onto the company at the end each year. It represents the cash the company needs to have at bank or on hand, readily accessible in order to be able to operate on a day-to-day basis. It is always greater than or equal to zero and generally set to be constant year-on-year for every year "n" of the 2003-2012 period. According to other embodiments, the minimum cash requirement may be set as a function of the company's credit rating. In certain instances, should the company not be able to produce through its operations, or raise on public and banking markets, enough cash to maintain this necessary end-of-year minimum balance, it will be allowed to draw on a revolving debt facility, as described below, at a rate that is generally higher than any other borrowing rate the company has regularly access to and may be set to depend on how the company is performing financially in order to match the minimum cash requirement. In those instances, the end of year cash balance for any given year is by definition always equal to that year's minimum cash requirement, if any. According to other embodiments, it could be decided that companies are not allowed to draw on such a revolving facility, or that such borrowing is capped to a given amount that could depend on the company's credit rating, and that any company unable to meet their minimum cash requirement would be declared bankrupt and be de facto withdrawn from the simulation.

According to various embodiments, the interest income rate gained on cash held during the course of the year is lower than the interest expense rate paid on some debt tranches the company has contracted and that the company may repay early at its own discretion without any penalty. In those instances, any cash held in excess of the minimum requirement and that has not been used in the course of the year's activities or for the mandatory repayment of debt principal can and will automatically be used for the retirement of any debt still outstanding at the end of the year and that can be retired early without any penalty, since it is more profitable for the company to do so. The cash available for early debt retirement figures of the debt schedule for a given year are obtained by subtracting the minimum cash requirement from the sum of the beginning of year cash balance, cash availability from the previous year's undrawn bank facilities and cash flow post mandatory non-operational payments. The cash available from the previous year's undrawn bank facilities represents any undrawn portion of bank facilities that is now drawn and not used for anything else than the replenishment of the cash account in order to meet the minimum cash requirement before having to draw on the revolving debt facility.

Therefore, according to various embodiments, for a given year "n", the end of year cash available for early debt retirement may be defined by the following equation:

End of year cash available for early debt retirement$_n$=End of year cash$_{(n-1)}$+Cash available from the previous year's undrawn bank facilities$_n$+Cash flow post mandatory non-operational payments$_n$−Minimum cash requirements The teams should try to keep cash at a minimal position equal to the minimum cash requirement, borrow debt if needed to sustain this minimal level, and use up all the excess cash in order to repay for revolver debt and current bank loan facilities. However, should the company generate more cash than it has to repay debt, the excess cash will pile up in the cash position.

The revolver debt entry in the debt schedule represents a debt item that may be used to raise any cash that may be needed in order to sustain the minimum cash requirement. According to various embodiments, the revolver debt is equal to the previous year's balance plus the following figures, if any:

1) Maturing debt tranches;
2) Mandatory revolver debt repayments;
3) Any one-off exceptional cash payments for the year such as, for example, litigation fines, pension contributions, etc.; and
4) Optional repayments or debt additions.

The financial model is structured such that the mandatory repayment of all debt tranches are made through the revolver debt. A description of the various debt tranches is provided hereinbelow. The mandatory revolver debt repayments are generally set to zero, but may also be set to a negative value. The one-off exceptions are generally negative and depend on the pre-set events occurring in the economy throughout the simulation. The optional repayments are equal to the minimum between the cash available for early repayment and the pre-optional repayment revolver debt. Therefore, the optional repayments are negative and treated as a cash outflow if the pre-optional repayment revolver debt is positive.

The revolver debt can be repaid in total if the cash available for early repayment is greater than the pre-optional repayment revolver debt, or can be repaid up to the amount of the cash for early repayment. If the cash available for early repayment is greater than the pre-optional repayment revolver debt, then the remainder, which is equal to the difference between the cash available for early repayment and the pre-optional repayment revolver debt, will be used for other debt repayments. If there is no other debt to repay, this remainder will be piled up in the cash position. If however all the revolver debt has been repaid with the mandatory repayment and the pre-optional repayment revolver debt is zero, the cash available for early repayments has to be used up. According to various embodiments, the revolver debt for the 2003 end of year balance is initialized and set to zero.

The financial model is structured such that various types of debt tranches may be utilized by the participants. The various types of debt tranches may include, for example, commercial paper/short term debt, a bank facility, and a bond/long-term debt. Tranches are raised on December 31$^{st}$—the date the board meets—and the full amount of the tranche is entered in the beginning of year balance for the year following the board meeting.

The commercial paper/short-term debt represents debt tranches having a one-year maturity such that the principal has to be repaid a year after this debt tranche was raised. According to various embodiments, the end of year balance in a given year for a commercial paper is generally determined by the sum of the beginning of year balance and the optional repayments. The beginning of year balance is equal to end of year balance for the previous year, except where the tranche has been raised at the previous year's board meeting. The optional repayments are a negative value.

According to various embodiments, the initialization value for the commercial paper/short term debt is set to zero in 2003, unless the tranche had already been raised by then, in which case the 2003 end of year balance is equal to the amount previously raised for this specific tranche less any repayment that may have occurred in the past. When the commercial paper reaches its maturity, it is considered repaid in full. The unreimbursed portion of the commercial paper's principal (i.e. the final year before redemption end of year balance) goes into the maturing facilities line of the debt schedule.

Bank facility represents a contract between a bank and the company under which the bank will give the company access to a certain amount of cash that the company doesn't have to draw all at once. The certain amount of cash may be referred to as the size or the full amount of the facility. The company may draw on the facility only when it needs it. It then pays interest on the drawn amount and a much smaller commitment fee on the undrawn amount.

The bank facility debt may represent tranches that have a two-year maturity and are redeemable early. Thus, optional repayments are allowed before the principal is due and the remainder has to be repaid two years after the tranche was raised. The remainder is determined by subtracting the sum of the optional repayments from the principal. According to various embodiments, the end of year drawn portion of a bank facility is equal to the sum of the beginning of year drawn portion post use of undrawn portion, mandatory repayments and optional repayments.

The beginning of year drawn portion post use of undrawn portion may be set equal to the maximum of zero and the difference between the size of the facility and the cash available from the previous year undrawn bank facilities.

The mandatory repayments figure is generally set to zero but may also be set to a negative value. The optional repayments figure is a negative figure. According to various embodiments, the initialization value for the optional repayments figure is set to zero in 2003, unless the tranche had already been raised by then, in which case the 2003 end of year balance is equal to the size raised for this specific tranche less any repayment that may have occurred in the past.

The use of undrawn portion is equal to the cash available from the previous year's undrawn bak facilities (i.e. headroom available) and the cash needed to avoid an increase in the revolver debt because of other debt tranches and the potential negative difference between the sum of the beginning of year cash balance and the cash flow post mandatory non-operational payments on the one hand and the minimum cash requirement on the other hand. According to various embodiments, the end of year undrawn portion of a bank facility is determined by subtracting the end of year drawn portion from the size of the facility.

When the commercial paper reaches its maturity, it is repaid in full. The unreimbursed portion of the commercial paper's principal (i.e. the final year before redemption end of year drawn portion balance) goes into the maturing facilities line of the debt schedule and the undrawn portion is simply cancelled and set to zero.

The bond/long-term debt may represent tranches that have a five-year maturity and, for simplification purposes, are not redeemable early. The principal is due five years after the tranche was raised and no optional repayments are allowed before that date. According to various embodiments, the end of year bond balance is constant and equal to the size of the bond, except when it reaches its maturity. When the bond reaches maturity, the end of year value becomes zero and the full amount of the bond is transferred to the maturing facilities line of the debt schedule. As to the initialization of the bond, the end of year balance corresponding to the board meeting in which the debt raising is decided may be set equal to the size of the bond.

As stated hereinabove, there can be various types of tranches. The financial model may include one or more rules related to early or optional repayments. For example, one rule may be that early or optional repayments can only affect the revolver debt and bank liabilities. For the tranches that can be repaid, the order of priority for the repayment is as follows:
1) Revolver debt;
2) Bank facilities, in increasing order of maturity such that priority is given to bank facilities that mature sooner.

In principle, for a given tranche, as much as possible, if not all of what is left to repay in the given tranche is reimbursed with the cash available for early repayments minus whatever repayments have been made for tranches that had priority in the reimbursement order. When the cash available for early repayments has been fully used, the repayments stop. If, however, further to all needed and potential repayments, cash is still available, it piles up into the cash balance. The stated principle also applies to revolver debt.

According to various embodiments, the only debt item for which the optional repayments line can be positive, and therefore represent a debt increase rather than a decrease, is the revolver debt. This may occur when the cash available for early repayments is negative. The cash available for early repayments may be negative when the cash flow for optional repayment is negative and can not be compensated by any cash in excess of the minimum cash requirement level or by any undrawn bank loan facility.

The maturing facilities line of the debt schedule represents the sum of all the maturing facilities for the year. Accordingly, the maturing facilities are thus taken out of their original debt balances.

For the cash line of the debt schedule, the end of year balance in a given year for a commercial paper may be determined by subtracting all the optional repayments made for all possible tranches from the sum of the beginning of year balance, the use of undrawn bank facilities, and the cash flow post mandatory non-operational payments. The beginning of year balance may be set equal to the end of year balance for the previous year. The use of undrawn bank facilities may be set to a positive value, and the cash flow post mandatory non-operational payments may generally be set to a positive value.

With respect to the interest expense line of the debt schedule, for each tranche, a yearly interest expense rate is defined on the day the debt is raised. This rate can be fixed for most tranches or can be variable for the revolver debt. The interest rate may evolve with time and may depend on another rate such as, for example, Euribor. The fluctuation of the another rate and the fluctuation of the industry index may be predetermined prior to the start of the simulation.

According to various embodiments, in a given year and for a given tranche, the interest expense is calculated by multiplying the interest rate for the period by the average between the beginning of year and the end of year balances of the tranche. The sum of the interest expenses for all the tranches will then be subtracted from the interest income in order to get to the income statement's net interest expense line.

With respect to interest income, for the cash line of the debt schedule, a yearly interest income rate may be defined and fixed for the purpose of this instance of the simulation. According to various embodiments, in a given year the interest income is calculated by multiplying the interest rate for the period by the average between the beginning of year and the end of year balances for the cash. The sum of the interest expenses will then be subtracted from the interest income in order to get to the income statement's net interest expense line.

Apart from the decisions selected to be implemented, specific events that the team is not aware of in advance might kick in a given year. The events may be exogenous or endogenous, and may directly impact the group standalone financials, as their occurrence is independent of the way the team plays. According to various embodiments, these events may include, for example, litigation fines and pension contributions.

During the simulation, a given division may be assessed a litigation fine, and the company has to pay the fine for having held this company at the time of the misdeed, even if the company has since sold the division. In that case, the value of the fine is added to the mandatory repayments of the revolver debt facility in the debt pay-down schedule. This amount will also be taken into consideration in the debt revolver of the decisional consolidation. The litigation fines may be pre-determined prior to the start of the simulation.

During the simulation, a team may be assessed a pension contribution. When an unfounded pension deficit reaches high levels, the company may be forced to fund its pension fund. The actual amount that will have to be paid requires to know what divisions are still in the company's perimeter at the time of payment, and also what additional standalone entities have been consolidated.

The amount of the finding required may be pre-determined prior to the start of the simulation. As a proxy to account for the difference in perimeter between the various teams and the subsequent difference in number of employees and defined contribution schemes that the company is liable for, the amount that will assessed is proportionate to the revenues of the company in that year. For example, 100% of the amount initially stated will have to be paid for a company that would have retained all its initial divisions but not acquired any division. The amount would then be equal to the revenues for the divisions currently held divided by the revenues of the initial standalone company times the amount initially stated. The revenues for the divisions currently held are determined by the revenues in the previous year. The revenues of the initial standalone company are also determined by the revenues in the previous year. The final amount may also be taken into consideration in the debt revolver of the decisional consolidation.

Throughout the simulation, standalone entities are put up for sale at given points in time at a price. The price may be set prior to the start of the simulation and may be fixed depending on the state of the economy and the prospects of the entity on the year of sale. Unless prevented by the rules, a given standalone entity can be put up for sale in any year, continuously year on year or discontinuously, and the price of purchase can be different year on year, as the economy and the prospects for the entity for sale vary.

All acquisitions are available to all competing teams, provided they can find the acquisition. All acquisitions are paid in cash and the teams have to raise the money if they do not have it on hand. For example, a team may have to raise the funds by selling of one of their divisions or through a debt or equity issuance.

All acquirable entities have the same activity as one of the divisions of the company. Once acquired, it will be consolidated to the corresponding division, within the company. Therefore, if an acquirable entity is related to a division of the company that has already been sold, it will not be possible to make that acquisition. According to various embodiments, it may not be possible to sell a division once another similar entity has been added to it. Therefore, it may not be possible to buy an entity then later sell the entity.

The financial model may include a spreadsheet for each acquirable entity. The spreadsheets may be embodied as Excel spreadsheets and may be referenced as AcquirableEntity1, AcquirableEntity2, etc. Each of these spreadsheets may comprise a simplified income statement, a simplified cash flow statement and a single line balance sheet.

The simplified income statement of the acquirable entity spreadsheet may include, for example, the following categories: revenues, EBITDA, D&A, EBIT, tax, and unlevered net income.

The revenue figures of the simplified income statement may include fictitious "actual" figures for 2002 and 2003, and projections for the years 2004-2012. Revenues growth is a driver of the company's value.

The EBITDA figures of the simplified income statement may include fictitious "actual" figures for 2002 and 2003, and projections for the years 2004-2012. The EBITDA margin is a driver of the company's value.

The D&A figures of the simplified income statement may include fictitious "actual" figures for 2002 and 2003, and projections for the years 2004-2012. D&A as a percentage of revenues is a driver of the company's value.

The EBIT figures of the simplified income statement may include fictitious "actual" figures for 2002 and 2003, and projections for the years 2004-2012. According to various embodiments, the EBIT figures are obtained by adding D&A to EBITDA in any given year.

The tax figures of the simplified income statement may include fictitious "actual" figures for 2002 and 2003, and projections for the years 2004-2012. The tax rate is a driver of the company's value. According to various embodiments, the tax rate is kept constant and equal for each division. At the divisional level, debt is not taken into account and the yearly tax amount for each division may be calculated on the basis of the EBIT. When the EBIT is negative, tax has may be set to zero.

The unlevered net income figures of the simplified income statement may include fictitious "actual" figures for 2002 and 2003, and projections for the years 2004-2012. The unlevered net income may be obtained by adding tax (negative) to EBIT in any given year.

The simplified cash flow statement of the acquirable entity spreadsheet may include, for example, the following categories: EBITDA, tax, capex, and unlevered free cash flow. The EBITDA figures of the simplified cash flow statement are directly linked to the EBITDA figures in the simplified income statement for every year of 2002-2012 period. Similarly, the tax figures of the simplified cash flow statement are directly linked to the tax figures in the simplified income statement for every year of the 2002-2012 period.

For the capex figures of the simplified cash flow statement, capex as a percentage of revenues is the driver of the company's value. The unlevered free cash flow figures of the simplified cash flow statement may include fictitious "actual" figures for 2002 and 2003, and projections for the years 2004-2012. The unlevered free cash flow may be obtained by adding tax and capex (usually both negative) to EBITDA in any given year.

The single line balance sheet of the acquirable entity spreadsheet may include a category designated as Book Value. The book value figures may include fictitious "actual" figures for 2002 and 2003, and projections for the years 2004-2012. As the divisions are assumed not to pay any interests, the book value may be obtained by adding to the previous year's book value the current year's unlevered net income.

The set of drivers ($g_n$, $m_n$ %, $p_n$ %, t, $q_n$ %) used for each financial year "n" between 2004 and 2012 are meant to reflect the expectations of the market on the entity for the years to come and can change from year to year.

The group standalone consolidation disclosed hereinabove provides a view of the company's financials without taking into consideration any decision during the board meetings. At each board meeting, the team can test various sets of decisions and then select a final set for implementation. The final set will be used to compute the company's financials for the years to come. According to various embodiments; the decisions can be of the following types: growth/expansion strategy, defensive/cost reduction strategy, short-term financing strategy, long-term financing strategy, and reorganization of capital structure.

Teams may pursue a growth/expansion strategy through an acquisition. An acquisition concerns only those standalone entities that are being put for sale in a given period. The purchase price of an acquisition represents the aggregate value of the target. The aggregate value is the sum of the target's equity value and its current year net debt. In the absence of minority interests, the net debt may be defined as the financial debt minus the cash position on the balance sheet. According to various embodiments, if a minority interest position in the company's balance sheet exists, it may be added to the net debt.

To execute the acquisition, the team may arrange for acquisition financing. Otherwise, the acquisition will be funded by a high interest facility. The rules of the simulation may prohibit acquisitions and disposals in the same line of business. The terms of the decision are the purchase price and the financials (current and forecasts) of the standalone entity. Each team is informed on the price and on the current and forecasted financials of any entity that up for sale, in a given year. Every year an entity is put up for sale, the forecasted financials of the standalone entity given to the team are those corresponding to the set of drivers in the acquirable entity spreadsheet corresponding to that given year. The prices for each year and each standalone entity may be fixed prior to the start of the simulation. For a given year, these prices reflect the prospects of each standalone entity from that year's perspective.

Teams may also pursue a growth/expansion strategy through an internal investment. A typical investment program pattern selected for implementation would be a one-off investment generating gross returns of a given rate in the year after the board meeting where it was implemented and a higher rate in subsequent years. Investment programs have a cost associated therewith and have to be paid in cash. The team has to arrange the financing to fund the investment program, otherwise it will be funded by a high interest facility. The rules of the simulation may only permit investment programs to be implemented a limited number of times during the course of the simulation. For example, the investment program may not be available to a team in every year. The terms for each year's investment program may be pre-determined prior to the start of the simulation.

Teams may pursue a defensive/cost reduction strategy through a disposal. Any division can be sold in any given year, provided that the company still owns it and the company has not yet acquired a standalone entity that was consolidated to the division to be sold. The proceeds of the disposal are net of tax and may change depending on market conditions. The rules of the simulation may not permit acquisitions and disposals in the same line of business. The terms of the decision are the proceeds that the company gets for the sale and any information that the team has learned about the division since the beginning of the simulation. No more information on the division is handed out to the competing teams. Subject to certain simulation rules, divisions can be sold in any given year. However, a restriction may be imposed in a given year to prevent the sale of a division. The terms of disposal in each year for a given division may be pre-determined prior to the start of the simulation.

Teams may also pursue a defensive/cost reduction strategy through margin enhancement. Margin enhancement programs improve EBITDA margins by a given percentage of revenues in future years. The rules of the simulation may only permit margin enhancements to be implemented a limited number of times during the course of the simulation. For example, the margin enhancement program may not be available to a team in all years. The terms of the decision are the cost of the margin enhancement program and the increases in EBITDA margin achieved year-on-year post-implementation. According to various embodiments, some margin enhancement programs may be implemented at no cost. The terms of the margin enhancement program in each year may be pre-determined prior to the start of the simulation.

Teams may pursue a short-term financing strategy by issuing commercial paper/short-term debt that matures every year. The size and terms of financing may change depending on economic and company conditions. The two sizes available for implementation are a large issue and a small issue. The rules of the simulation may prevent selecting a large and small issue of commercial paper in the same year. In addition, commercial paper issues of both size categories may not be available to a team in all years. The terms of the decision are the size of the issue and the coupon. The coupon, or interest rate paid on the debt tranche, can be fixed or variable. If the coupon is fixed, it remains constant until the debt tranche is repaid in full. If the coupon is variable, it is an affine function of a given rate. According to various embodiments, the given rate may be Euribor, and may be pre-determined prior to the start of the simulation. Such information may be communicated to the teams at the beginning of every board meeting. The terms may depend on the credit rating of the company at the time the debt tranche is raised and on the type and size of the debt raised, in any given year. The correspondence between the terms used for a given credit rating in a given year may be pre-determined prior to the start of the simulation. For example, the cost of debt may increase with the size of the tranche, the worsening of the credit rating and with the debt maturity.

Teams may also pursue a short-term financing strategy through bank facilities. The size and terms of financing may change depending on economic and company conditions. The two sizes available for implementation are a large facility and a small facility. The rules of the simulation may prevent selecting a large facility and a small facility for implementation in the same year. In addition, bank facilities of both size categories may not be available to a team in all years. Bank facilities mature every two years and can be redeemed early. The bank facilities may carry a given commitment fee in addition to the given coupon, and may carry repayment covenants. For example, a team may be required to refinance a given bank facility if the bank facility is downgraded to non-investment grade. The terms of the decision are the size of the issue and the coupon. The coupon, or interest rate paid on the debt tranche, can be fixed or variable. The terms depend on the credit rating of the company at the time the debt tranche is raised and on the type and size of the debt raised, in any given year. The correspondence between the terms used for a given credit rating in a given year may be pre-determined prior to the start of the simulation. For example, the cost of debt may increase with the size of the tranche, the worsening of the credit rating and with the debt maturity.

Teams may pursue a long-term financing strategy by issuing long-term bonds. The size and terms of financing may change depending on general economic and company circumstances. The two sizes available for implementation are a large issue and a small issue. The rules of the simulation may prevent selecting a large issue and a small issue for implementation in the same year. In addition, long-term bond issues of both size categories may not be available to a team in all years. Long-term bonds have a 5 year bullet maturity, carry no repayment covenants and cannot be redeemed early. The terms of the decision are the size of the issue and the coupon. The coupon, or interest rate paid on the debt tranche, can be fixed or variable. The terms depend on the credit rating of the company at the time the debt tranche is raised and on the type and size of the debt raised, in any given year. The correspondence between the terms used for a given credit rating in a given year may be pre-determined prior to the start of the simulation. For example, the cost of debt may increase with the size of the tranche, the worsening of the credit rating and with the debt maturity.

Teams may also pursue a long-term financing strategy by issuing equity. The size and terms of financing may change depending on general economic and company circumstances. The two sizes available for implementation are a large issue and a small issue. The rules of the simulation may prevent selecting equity to be issued in conjunction with special dividends. In addition, equity issues of both size categories may not be available to a team in all years. The terms of the decision are the discount of the issue price compared to current share price and size of the issue. This may be expressed in value as a percentage of the total current market capitalization, defined as the current number of shares outstanding multiplied by the current share price. The discount to the current share price generally increases with the size of the issue. The terms of the issue for each year may be pre-determined prior to the start of the simulation to reflect the market conditions in any given year.

Teams may pursue a reorganization of capital structure by paying a special dividend. The special dividend may be net of taxes incurred by shareholders. The share price will rise by the value of the dividend, net of taxes paid. According to various embodiments, any tax cut proposals will have no impact on the taxation of the special dividend. The rules of the simulation may prevent the special dividend from being available to a team in all years. The terms of the decision are the size of the dividend and the tax paid by the shareholders. The terms of the special dividend for each year may be pre-determined prior to the start of the simulation.

Teams may also pursue a reorganization of capital structure through a debt-to-equity swap that involves redeeming a given portion of the outstanding bond-debt. The rules of the simulation may limit the swap of outstanding bond debt to the swap of long-term debt only. In addition, the debt-to-equity swap may not be available to a team in all years. The terms of the decision are the proportion of the outstanding bond-debt available for the debt-to-equity swap and the discount of the share price at which the subsequent share issuance is made compared to the current share price. A team may choose to swap all the outstanding bond-debt or not to swap at all. The terms of the debt-to-equity swap may be pre-determined prior to the start of the simulation, and a restriction as to the maximum value of the debt-to-equity swap may also be pre-determined prior to the start of the simulation. The pre-determined maximum value for one year may be different than the pre-determined maximum value for another year.

According to various embodiments, the simulation may allow for financial and strategic decisions other than or in addition to the types detailed hereinabove (growth/expansion strategy, defensive/cost reduction strategy, short-term financing strategy, long-term financing strategy, and reorganization of capital structure). The terms and patterns of the decisions described hereinabove may also be changed.

To provide a view of the company's financials after taking into consideration any decisions selected for implementation at a board meeting, a decisional consolidation spreadsheet is utilized to take into account the consecutive sets of decisions taken by the team and displays the pre-board meeting financials in a given year. The spreadsheet may be embodied as an Excel spreadsheet in the same manner as the group standalone consolidation spreadsheet and may be referenced as HighInterestDecisionalConsolidation. The set of financials comprising the decisional consolidation spreadsheet may be used for the determination of the share price and the credit rating in a given year. Prior to a board meeting, this consolidation is calculated depending on the decisions that the team has made up until, and including, the previous board meeting.

The basis for the consolidation is the group standalone. Various adjustments in each year are applied, depending on the decisions taken. Every year, when a decision is taken, its effects will be included in the consolidation and the effects of the decisions taken in any later board meeting will be superimposed to the consolidation that resulted from all the decisions taken up until and excluding this given year's board meeting. The consolidation also takes into account the facts that the drivers for the divisions change with time, as the initial layer of the consolidation is the group standalone consolidation.

With respect to the possible decisions described hereinabove, and keeping in mind that the financials having the modifications applied thereto are the pre-board meeting decisional consolidation financials at the beginning of the board meeting, after any prior action has been taken in the current board meeting the effects on the consolidation would be as described below. According to various embodiments, the order in which the decisions are taken in a board meeting does not matter, decisions are additive and commutative within a given board meeting.

When a growth/expansion strategy is pursued through an acquisition, the acquired entity is consolidated to the company in the same way as described in the standalone consolidation, for the years to come. There is no pro form a retrospective consolidation of the acquired entity, the consolidation starts in the year of acquisition. In terms of display, for the new entity, the revenues and EBITDA appear added to the corresponding line for the division that has the same business as the acquired entity, otherwise a new line would be displayed. The purchase price is taken out of the cash position in the debt pay-down schedule for the next year. Therefore, the case position has to be refinanced. The rules of the simulation may impose a minimal cash position for each year of the simulation, and the minimal cash position may be pre-determined prior to the start of the simulation. In case the cash position of the company is inferior to the minimal required cash position and the company is falling short of cash after all chosen decisions have been combined and implemented, the cash position will be automatically refinanced through the revolver debt.

When a growth/expansion strategy is pursued through an internal investment, the gross returns defined by the program pattern will be added to the total EBITDA line. The cost of the program is taken out of the cash position in the debt pay-down schedule for the next year. The refinancing of the cash position also applies.

When a defensive/cost reduction strategy is pursued through a disposal, the sold entity is deconsolidated from the company in a way symmetrical to the way the consolidation is performed at the group standalone level. The revenues of the division are taken out of the consolidated revenues for the years to come. The EBITDA of the division is taken out of the consolidated EBITDA for the years to come. The D&A of the division is taken out of the consolidated D&A for the years to come. The capex of the division is taken out of the consolidated capex for the years to come. The net proceeds from the disposal are added to the book value in the current year. The net proceeds are determined by subtracting the book value of the division from the sale price. The gross proceeds are added to the cash position in the debt paydown schedule for the year.

When a defensive/cost reduction strategy is pursued through a margin enhancement, the supplementary margin percentages for each year are added to the EBITDA margin in the future years.

When a short-term financing strategy is pursued by issuing commercial paper/short-term debt, a new item is created in the debt pay-down schedule as explained in the group standalone consolidation. The cash raised is added to the cash position in the debt pay-down schedule for the next year.

When a short-term financing strategy is pursued through bank facilities, a new item is created in the debt pay-down schedule as explained in the group standalone consolidation. The cash raised is added to the cash position in the debt pay-down schedule for the next year.

When a long-term financing strategy is pursued by issuing long-term bonds, a new item is created in the debt pay-down schedule as explained in the group standalone consolidation. The cash raised is added to the cash position in the debt pay-down schedule for the next year.

When a short-term financing strategy is pursued by issuing equity, the number of shares issued is added to the number of total shares outstanding. The number of shares outstanding may be set prior to the start of the simulation. The cash raised is added to the book value of the company for the current year and to the cash position in the debt pay-down schedule for the next year.

When a reorganization of capital structure strategy is pursued by paying a special dividend, the total (pre-shareholder tax) value of the special dividend is withdrawn from the book value of the company in the current year. The total value of the special dividend is withdrawn from the book value of the company in the current year.

When a reorganization of capital structure strategy is pursued through a debt-to-equity swap, the full value of the debt-to-equity swap is added to the current year's book value. The bond tranches or portions thereof that were eligible for the debt-to-equity swap are repaid. The number of shares outstanding increases by the number of shares issued in exchange for the redemption of the bonds.

If there is a cash shortfall after the implementation of a test decision or a final decision, the amount of cash needed to bridge the difference between what the cash amount should be post-decisions and what the cash amount is required to be so that the company does not go bankrupt is financed through the revolver debt facility in the debt pay-down schedule.

If this revolver debt facility has to be used, it means that the team has not carefully pre-funded its corporate actions (e.g., acquisitions, investments programs or special dividend). Therefore, in a normal world, the company should have gone bankrupt and the game would have ended for the team. Instead and by principle, the simulation may force the teams to take a supplementary, compulsory action that will raise the needed cash through the revolver debt facility. The cost of debt is very expensive and serves to penalize the team that is forced to raise the needed cash in this manner.

The interest paid year-on-year on the revolver debt facility may be predetermined prior to the start of the simulation. For example, the respective interest rates paid for the group standalone debt revolver facility can be—from 2004 to 2009- 8.00%, 7.25%, 7.25%, 6.50% and 6.25%, whereas the interest rates paid for the decisional consolidation could be respectively 15.00%, 16.00%, 17.00%, 18.00% and 19.00%. The pattern of increasing interest rates paid for the decisional consolidation serves to make the penalty more harmful year-on-year. According to various embodiments, the interest rates paid for the decisional consolidation may follow other patterns.

As disclosed hereinabove, in a given year, specific exogenous or endogenous events that the team is not aware of in advance may kick in. Teams are only warned about such an event at the beginning of the board meeting in which they kick in. The event directly impacts the consolidated financials. For example, when a litigation fine is assessed, the amount of the fine will be taken into consideration in the debt revolver of the decisional consolidation, as a mandatory repayment. The high interest will be triggered if the payment of the fine is not funded. When a pension contribution is assessed, the contribution will be taken into consideration in the debt revolver of the decisional consolidation, as a mandatory repayment. The high interest will be triggered if the contribution itself is not funded.

For the purpose of valuation, various financial ratios and metrics are computed for the credit profile of the company at a given point in time, within this decisional consolidation spreadsheet. The ratios and metrics may include, for example, EBIT cover, EBITDA margin, operating cash flow to net debt ratio, net debt to capital ratio, operating cash flow to net debt plus pensions ratio, net debt plus pensions to capital ratio, net debt to EBITDA ratio, earnings per share (EPS), and return on invested capital (ROIC) based on post-tax EBIT.

The EBIT cover, in any given year, is determined by dividing EBIT by the net interest expense. If the net interest expense is zero, then "NM" (standing for "Non meaningful") is entered for the EBIT cover.

The EBITDA margin is not computed for the credit profile. Rather, it is determined as from the income statement.

The EBITDA cover, in any given year, is determined by dividing EBITDA by the net interest expense. If the net interest expense is zero, then "NM" is entered for the EBITDA cover.

The operating cash flow to net debt ratio, in any given year, is determined by dividing the operating cash flow by the net debt. If the net debt is zero, then "NM" is entered for the operating cash flow to net debt ratio.

The net debt to capital ratio, also called net financial gearing, is determined in any given year by dividing the net debt by the sum of the net debt and the book value. If the sum of the net debt and the book value is zero, then "NM" is entered for the net debt to capital ratio.

The operating cash flow to net debt plus pensions ratio, in any given year, is determined by dividing the operating cash flow by the sum of the net debt and the unfunded pension deficit. The unfounded pension deficit in a given year is equal to a fixed amount for the standalone, which may be pre-determined prior to the start of simulation, multiplied by a percentage calculated as the revenues for the divisions currently held divided by the revenues of the initial standalone company. The revenues for the divisions currently held are revenues in the previous year, and the revenues of the initial standalone company are revenues in the previous year. If the sum of the net debt and the unfunded pension deficit is zero, then "NM" is entered for the operating cash flow to net debt plus pensions ratio.

The net debt plus pensions to capital ratio, in any given year, is determined by dividing the sum of the net debt and the unfunded pension deficit by the sum of the net debt, the unfunded pension deficit and the book value. The unfunded pension deficit in a given year is equal to a fixed amount for the standalone, which may be pre-determined prior to the start of simulation, multiplied by a percentage calculated as the revenues for the divisions currently held divided by the revenues of the initial standalone company. The revenues for the divisions currently held are revenues in the previous year, and the revenues of the initial standalone company are revenues in the previous year. If the sum of the net debt, the unfunded pension deficit and the book value is zero, then "NM" is entered for the net debt plus pensions to capital ratio.

The net debt to EBITDA ratio, in any given year, is determined by dividing the net debt by the EBITDA. If the EBITDA is zero, then "NM" is entered for the net debt to EBITDA ratio.

The EPS, in any given year is determined by dividing the net income by the total shares outstanding. The EPS may be determined and presented as a displayed analysis item available to the teams.

The ROIC based on post-tax EBIT, in any given year, is determined by dividing the product of [(1−Tax rate)×EBIT] by the average of the previous and the current years' invested capital. The invested capital is the sum of the book value and the gross debt. The ROIC based on post-tax EBIT may be determined and presented as a displayed analysis item available to the teams.

The high interest that has to be paid on the revolver debt has been implemented in order to penalize improper financing of corporate actions. However, it is in the interest of the team to be able to contemplate its financial forecasts with a properly funded business at the beginning of the board meeting. Any debt in the revolver debt facility does not require the high interest rate previously discussed, but an interest rate equal to the previous year's blended gross interest cost, or to any realistic cost of debt. The previous year's blended gross interest cost may be the total interest expense divided by total gross debt.

For that purpose, another consolidation spreadsheet has been created. This spreadsheet may be embodied as an Excel spreadsheet referred to as LowInterestDecisionalConsolidation. This spreadsheet may be similar to the HighInterestDecisionalConsolidation spreadsheet, but is different in that the interest rate used in the revolver debt facility has been set to a lower figure. For example, a credit profile has been defined, and an EPS and a ROIC calculated for each year for the spreadsheet.

According to various embodiments, the interest rate used for each year is normally equal to the average cost of debt in the previous year and cannot be greater than the cost of debt for the revolver debt facility in that year in the HighInterestDecisionalConsolidation spreadsheet. In addition, the interest rate cannot be smaller than a predetermined amount (e.g., 5%). The cap and floor have been set in order to keep the interest rate due on the revolver debt within "reasonable" boundaries.

Therefore, when unpredictable events such as a litigation fine or a compulsory pension contribution kicks in, the effect on the interest rate that can be seen in the financials presented to the team at the beginning of a board meeting is not abnormally penalizing under the EBIT line of the income statement. In addition, any debt contracted through the revolver debt facility in the previous round because of a cash shortfall is also subject to a somewhat normal interest rate.

In each given year, a team has access to two main data sheets. The first main data sheet provides the decisions available in a given year and the terms associated with the decisions. The terms depend on the status of the economy and on the financial position (e.g., credit rating) of the company. The second main data sheet provides a selection of financials that can be analyzed by the team in order to choose what decisions they want to have implemented According to various embodiments, the financials displayed for the teams include the following:
1) A simplified income statement showing, for the year following the current board meeting and the year after:
   a) the revenues, by divisions and consolidated;
   b) the EBITDA, by divisions and consolidated;
   c) the consolidated EBIT;
   d) the consolidated net interest expense;
   e) the blended gross interest cost, which is the total interest expense divided by total gross debt; and
   f) the EPS;
   g) the free cash flow; and
   h) the EBITDA cover.
2) The capital structure at the end of the board meeting in the current financial year, including:
   a) the immediate funding need, net of cash and one-off charges. The immediate funding need represents the cash that has to be funded before the debt revolver facility is activated, inclusive of all unforeseen charges such as, for example, a litigation fine or a compulsory pension contribution.
   b) the short-term debt, represented by the sum of all debt tranches due at the end of the next year.
   c) the medium-term debt, represented by the sum of all debt tranches due between one and two years later.
   d) the long-term debt, represented by the sum of all debt tranches due more than two years later.
   e) the total debt, represented by the sum of the immediate finding need (net of cash and one-off charges), the short-term debt, the medium-term debt and the long-term debt.
   f) the cash position, shown as a negative figure.
   g) the net debt/(cash), which is equal to the total debt plus the cash position.
   h) the available headroom under bank loans, represented by the sum of the amounts that have not been drawn in the various bank facilities the company has. All of this undrawn debt currently pays a low interest rate equal to the commitment fee of the loans, if only one such fee exists.
   i) the net debt to next year EBITDA prediction ratio.
   j) the shareholders' equity.
   k) the post-tax ROIC.

At the beginning of a board meeting, a team can see these forecast financials taken from LowInterestDecisionalConsolidation, for the reasons explained hereinabove. As soon as the team wants to make a test or select their final decision for implementation, all the calculations are made in HighInterestDecisionalConsolidation, and the penalizing revolver debt forces teams to fund themselves.

For example, if a team, in a given year, uses three tests and then selects a final decision to be implemented, the team can view the set of financials coming from LowInterestDecisionalConsolidation on a display before any decision has been taken. This will not change until the next board meeting, and will serve as a reference for the analysis, since no action yet has been undertaken and the revolver debt facility does not bear a huge cost of debt.

After the team has selected its first set of decisions to test, and the test is executed, a new similar set of financials will be displayed next to the pre-test financials. The new set of financials are calculated in HighInterestDecisionalConsolidation and are fixed until the next year. An EPS accretion/(dilution) line that compares the newly displayed EPS with the pre-board meeting LowInterestDecisionalConsolidation EPS is added at the bottom of the income statement. The EPS accretion/(dilution) figures are shown for both the year following the board meeting and year after. The same sequence follows the execution of the next two tests. After each test, the team can still see the results of the previous tests and can also still see the initial financials for the current board meeting. Finally, when the team decides to move onto its final set of decisions, a fourth set of financials is computed as for the tests and is displayed for the team.

According to various embodiments, the financial model determines the share price based on the index, a strategy score, and a capital structure score. The index represents the state of the economy and, for the purpose of the share price calculation, is taken as a proxy for the maximum achievable P/E ratio by the company.

A strategy score is given to a certain number of decisions or resulting situations of the company, in accordance with the game theory underlying various embodiments of the simulation. For example, according to various embodiments, the following strategy scores are given for the following decisions or resulting situations:

1) Having sold a given division: between 0.000 and 0.050
2) Having bought a standalone entity: between 0.050 and 0.075
3) Having implemented an investment program: 0.050
4) Holding one division (non-diversification): 0.000
5) Holding two divisions: 0.150
6) Holding three divisions: 0.075
7) Holding four divisions (non-focalization): 0.000
8) Being sub-investment grade: −0.050

An initial opening strategy score such as, for example, 0.5000 may be given to the company at the end of 2003. The strategy score, at a given point in time, is equal to the initial opening score plus the sum of the scores as described above and other scores given for decisions the team has taken up until the moment the share price is assessed. Scores are computed depending on the game theory invigorated, in terms of relative weightings for each decision taken or each situation rated. According to various embodiments, the maximum score is capped at 1.000 and the minimum score is floored to 0.000.

For the capital structure score, various metrics of the credit profile of the company are taken into consideration and each are given a weighting. According to various embodiments, these metrics may include the following:

1) Following year's forecasted EBITDA cover;
2) Following year's forecasted operating cash flow to net debt ratio;
3) Following year's forecasted net debt to capital ratio;
4) Following year's forecasted operating cash flow to net debt plus pensions ratio;
5) Following year's net debt plus pensions to capital ratio;
6) Following year forecasted operating cash flow to net debt ratio;
7) Following year forecasted operating cash flow to net debt ratio; and
8) Credit strategy score.

The credit strategy score is different than the previously described strategy score, in that the scores are different and there is no reference to the credit score. The credit strategy score is determined depending on the credit impact on the consolidated company of the entities and divisions, acquirable or disposable. The sum of all the weighting is 100%.

A scale associated with each given metrics enables the financial model to convert the covers and ratios in score between 0.000 and 1.000. For example, the scale may be utilized to convert 0.100 under a certain badly perceived value of the metrics and 1.000 above a very well perceived value of the metrics. The appreciation for the gradation on the attribution of the scores to the covers and ratios depends on the game theory underlying various embodiments of the simulation.

A supplementary impact may be added due to the impact of market rise or fall, depending on the divisions that the company still owns or had consolidated. A negative or positive impact may be added to the final capital structure score to reflect "translation" of the market upwards or downwards.

The capital structure score, at a given moment, may be set equal to the weighted average of the scores for each metrics, then potentially affected by the supplementary "translation", rounded to the first decimal. According to various embodiments, a rule of the simulation may prevent the capital structure score from moving upwards by more than 0.200 between two consecutive board meetings. In order to be even harsher to companies with a disastrous credit rating, if the company has fallen below investment grade, the maximum change upwards may be limited to 0.100 between two consecutive board meetings. A capital structure score smaller than 0.400 may indicate that the company has fallen below investment grade. According to various embodiments, the capital structure score is floored at 0.100 so that the company doesn't slip under a certain credit rating.

A credit rating is associated with each capital structure score. According to various embodiments, the credit rating associated with a given capital structure score may be as follows:

1) BB− for a score from 0.100 to 0.199;
2) BB for a score from 0.200 to 0.299;
3) BB+ for a score from 0.300 to 0.399;
4) BBB− for a score from 0.400 to 0.599;
5) BBB for a score from 0.600 to 0.799;
6) BBB+ for a score from 0.800 to 0.999; and
7) A− for a score of 1.000.

A strategy score is associated with each credit rating. According to various embodiments, the strategy score associated with a given credit rating may be as follows:

1) 0.100 for a rating of BB−;
2) 0.200 for a rating of BB;
3) 0.300 for a rating of BB+;
4) 0.500 for a rating of BBB−;
5) 0.700 for a rating of BBB;
6) 0.800 for a rating of BBB+; and
7) 1.000 for a rating of A−

The strategy score for the credit rating is then transferred to the strategy score calculation. From the foregoing, it is apparent that strategy and capital structure are intimately interwoven.

Depending on the state of the economy, weightings have been attributed to the strategy score and to the capital structure score for every change in the index, every market trend, and every point in the "market cycle". The sum of the weightings is 100%.

As to the calculation of the share price, the share price may be equal, for any given triplet (index, strategy score, capital structure score) to the maximum between 1.000 and the following product:
 a) Index (maximum P/E) multiplied by
 b) (Strategy score weighting×Strategy score+Capital structure score weighting×Capital structure score), multiplied by
 c) Next year's EPS+Cumulated special dividends According to various embodiments, the index and weightings may change every 30 seconds, thereby generating a change in the share price as well. The credit rating, and therefore the capital structure score in the strategy score, may be kept constant throughout a whole year and only changes after each board meeting. The share prices pre-board meeting and post-board meeting are different because the strategy scores and the capital structure scores are different, and because the reference year for the EPS changes by one year.

The financial model described hereinabove may be automated. For example, the calculations may be facilitated by various macros written, for example, in Visual Basic for Applications.

From block 10, the process advances to block 12, where various news stories are transmitted to the participants. The news stories may be presented to the participants via a display, and may include, for example, a business news story, an economic news story, a legal news story, a legislative news story, a political news story, a sports news story, or any combination thereof. Each news story can cause the financials of the market and/or the fictitious company to fluctuate.

From block 12, the process advances to block 14, where the financial model generates a new share price for the fictitious company based on changes in the financial market. The share price may be generated based on the index, the strategy score and the capital structure score as described hereinabove. Once the new share price has been generated, the index and the new share price may be transmitted to the participants. The transmitted index and new share price may be presented to the participants via a display. A new credit rating may also be generated, transmitted and presented in a similar manner. The process described for block 14 may be repeated with a predetermined frequency.

From block 14, the process advances to block 16, where a determination is made as to whether the time has yet arrived for the first board meeting. If the time has not yet arrived, the process returns to block 12, where the process advances as described above. If the time has arrived for the first board meeting, the process advances to block 18, where the share price is frozen at the start of the board meeting. A list of various courses of action is transmitted to the participants, and the list may be presented to the participants via a display. The list of the courses of action may be organized into various groupings such as, for example, a growth grouping, a defensive grouping, a short-term financing grouping, a long-term financing grouping, and a reorganization of capital structure grouping as described hereinabove. One or more rules defining authorized combinations of the various courses of action may also be transmitted along with the list to the participants.

From block 18, the process advances to block 20, where a set of test decisions selected by the participants is implemented for testing purposes. The set of test decisions may comprise one or more courses of action that the participants may wish to have implemented. For example, according to various embodiments, the set of test decisions may comprise up to three courses of action.

From block 20, the process advances to block 22, where new financial projections are generated based on the selected set of test decisions. The new financial projections are transmitted to the participants, and may be presented via a display alongside the initial financial projections.

From block 22, the process advances to block 24, where it is determined whether an additional set of test decisions may be implemented for testing purposes. A limited number of sets of test decisions may be implemented for testing purposes during a given board meeting. According to various embodiments, a maximum of three of sets of test decisions may be implemented for testing purposes during a given board meeting. If it is determined that an additional set of test decisions may be implemented for testing purposes (i.e., the maximum number has not been reached), the process returns to block 20, where the process advances as described hereinabove.

If it is determined that an additional set of test decisions may not be implemented for testing purposes (i.e., the maximum number has been reached), the process advances from block 24 to block 26, where a final set of decisions selected by the participants is implemented. The final set of decisions may include the courses of action the participants believe will best maximize the company's share price. The final set of decisions may comprise one or more courses of action that the participants may wish to have implemented. For example, according to various embodiments, the final set of decisions may comprise up to three courses of action.

From block 26, the process advances to block 28, where new financial projections are generated based on the selected final set of decisions. The new financial projections are transmitted to the participants, and may be presented via a display alongside the initial financial projections and the financial projections associated with the test decisions.

From block 28, the process advances to block 30, where it is determined whether an additional board meeting will be held. A limited number of board meetings may be held during the simulation. According to various embodiments, a maximum of five board meetings may be held over the course of the simulation.

If it is determined that an additional board meeting will be held (i.e., the maximum number has not been reached), the simulation enters into the next year, a new share price and credit rating are attributed to the company, the index starts to fluctuate again, and the process returns to block 12, where the process advances as described hereinabove.

If it is determined that an additional board meeting will not be held (i.e., the maximum number has been reached), the process advances from block 30 to block 32, where a summary is generated. The summary is transmitted to the participants, and may be presented to the participants via a display. According to various embodiments, the summary may include all of the test decisions and final decisions selected for implementation throughout the course of the simulation. The summary may also include the before and after share prices, and the before and after credit ratings for each year end except for the final year end.

From block 32, the process advances to block 34, where the final share price and credit rating are generated and transmitted to the participants. The final share price and credit ratings may be presented to the participants via a display. As explained hereinabove, according to various embodiments, the winning participant or team is the one who achieves the highest final share price.

Figure 2:
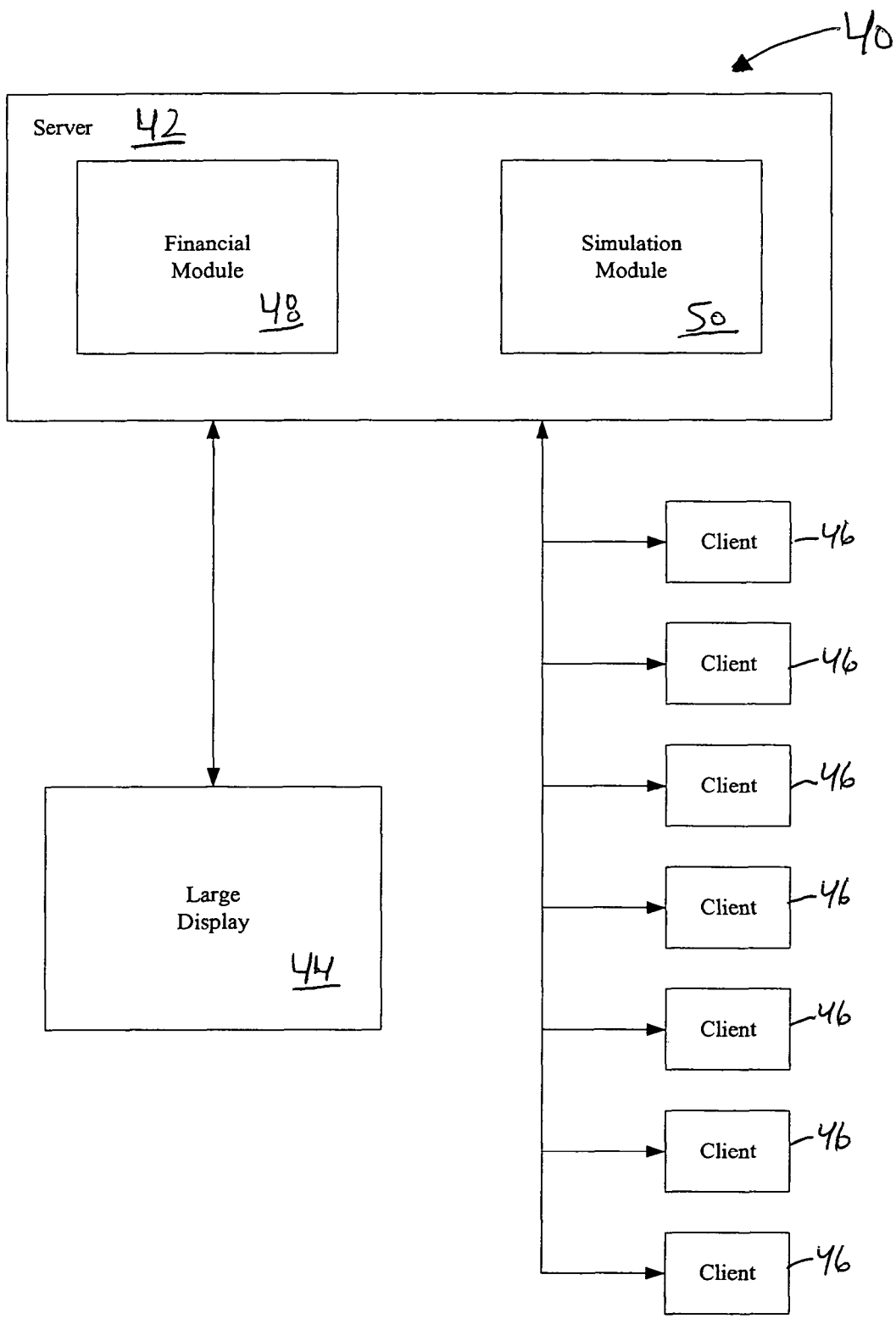
FIG. 2 illustrates various embodiments of a system for conducting an interactive financial simulation.

In another general respect, this application discloses embodiments of a system 40 for conducting an interactive financial simulation. FIG. 2 illustrates various embodiments of the system 40. The system 40 may be used to implement the method of FIG. 1. The system 40 comprises a server 42 that may be in communication with a large display 44 and one or more clients 46. According to various embodiments, the server 42 may be in communication with the large display 44 and the one or more clients 46 via a wired or wireless pathway.

The server 42 may include a financial module 48 for generating financials of a fictitious company and a simulation module 50 for directing the interactive financial simulation associated with the fictitious company. The modules 48, 50 may be structured and arranged to access and transmit information to the large display 44 and the one or more clients 46. For example, the financial module 48 may be structured and arranged to receive implementation requests from the one or more clients 46, then generate and transmit financials to the large display 44 and the one or more clients 46 in response thereto. The simulation module 50 may automatically access and transmit news stories to the large display 44.

The modules 48, 50 may be implemented as microcode configured into the logic of a processor of the server 42, or may be implemented as programmable microcode stored in electrically erasable programmable read only memories. According to other embodiments, the modules 48, 50 may be implemented by software to be executed by a processor of the server 42. The software may utilize any suitable algorithms, computing language (e.g., C, C++, Java, JavaScript, Visual Basic, VBScript, Delphi, ASP 3.0, DHTML, Excel VBA, T-SQL), and/or object oriented techniques and may be embodied permanently or temporarily in any type of computer, computer system, device, machine, component, physical or virtual equipment, storage medium, or propagated signal capable of delivering instructions. The software may be stored as a series of instructions or commands on a computer readable medium (e.g., device, disk, or propagated signal) such that when a computer reads the medium, the described functions are performed. According to various embodiments, the modules 48, 50 may be combined into a single module or may be divided into any number of modules.

Although the server 42 is shown in FIG. 2 as having wired data pathways connected to the large display 44 and the one or more clients 46, according to various embodiments, the server 42 may be interconnected to the large display 44 and the one or more clients 46 through a network having wired or wireless data pathways. The network may include any type of delivery system comprising a local area network (e.g., Ethernet), a wide area network (e.g., the Internet and/or World Wide Web), a telephone network, a packet-switched network, a radio network, a television network, a cable network, a satellite network, and/or any other wired or wireless communications network configured to carry data. The network may also include additional elements, such as intermediate nodes, proxy servers, routers, switches, and adapters configured to direct and/or deliver data.

FIGS. 3-24 illustrate a sequence of screen shots that may be presented to the participants throughout the course of a simulation that lasts for five periods. FIG. 3 shows the financials at the start of the first period of the simulation. At this point of the simulation, the starting share price is 35.56 Euros, the credit rating is BBB, and the immediate funding requirements are 396 MM Euros.

Figure 4:
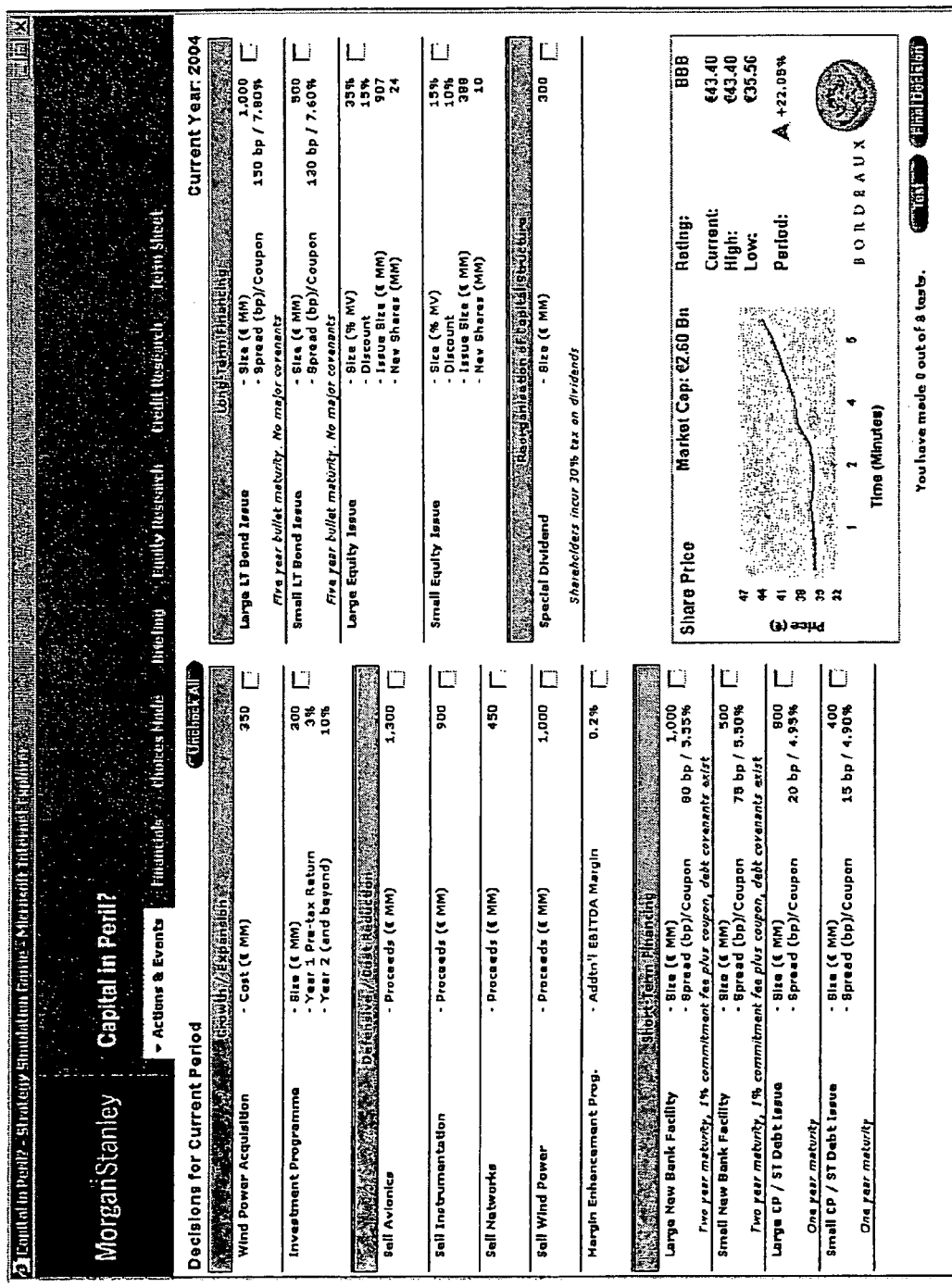

FIG. 4 shows sixteen decisions available to a team as the first board meeting begins. At this point of the simulation, the share price has risen to 43.40 Euros and the credit rating is still BBB.

Figure 5:
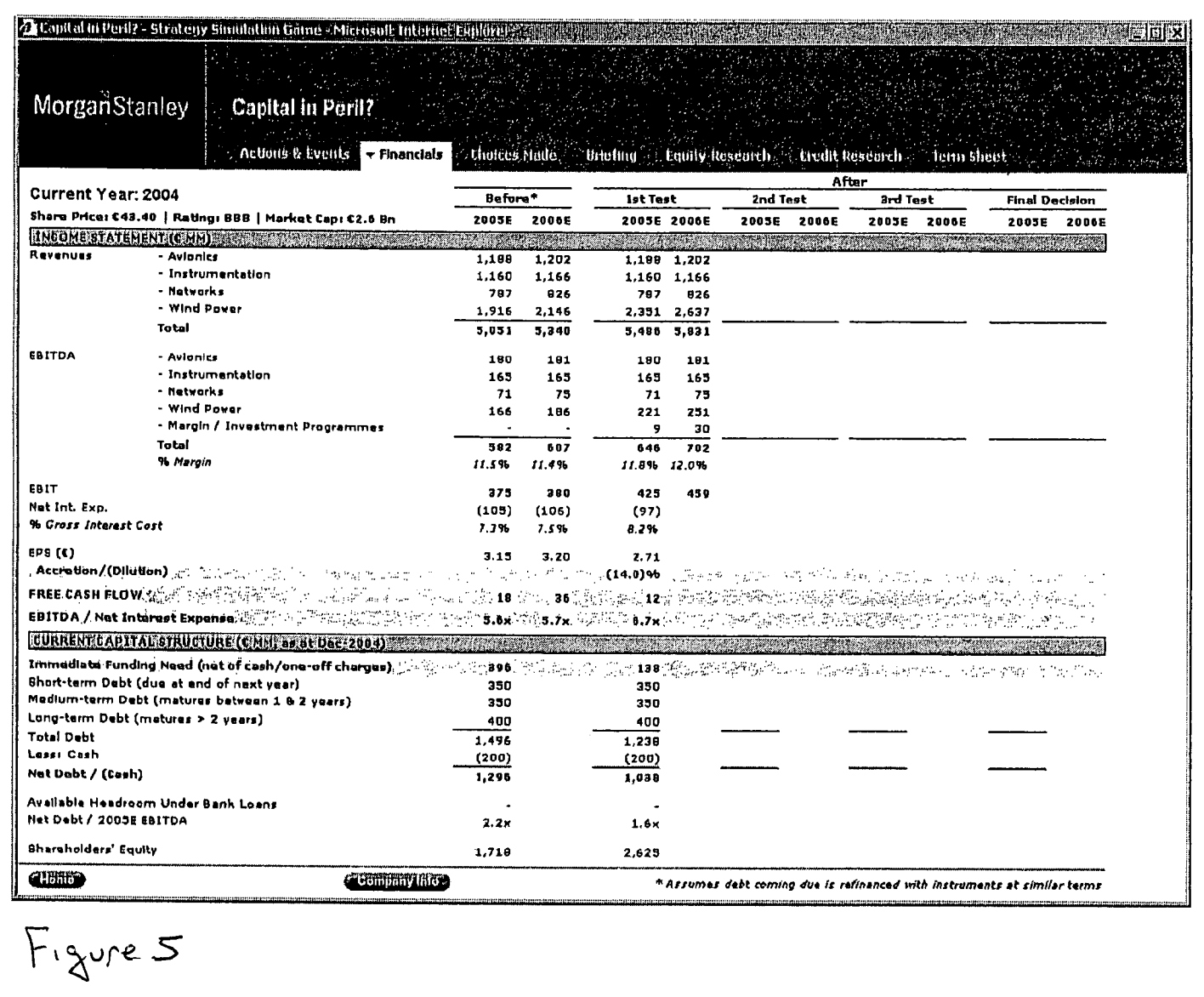

FIG. 5 shows the financials after the first set of test decisions has been implemented. The decisions chosen to generate the results were wind power acquisition, investment program, and large equity issue. At this point of the simulation, the share price is frozen at 43.40 Euros and the credit rating is frozen at BBB.

Figure 6:
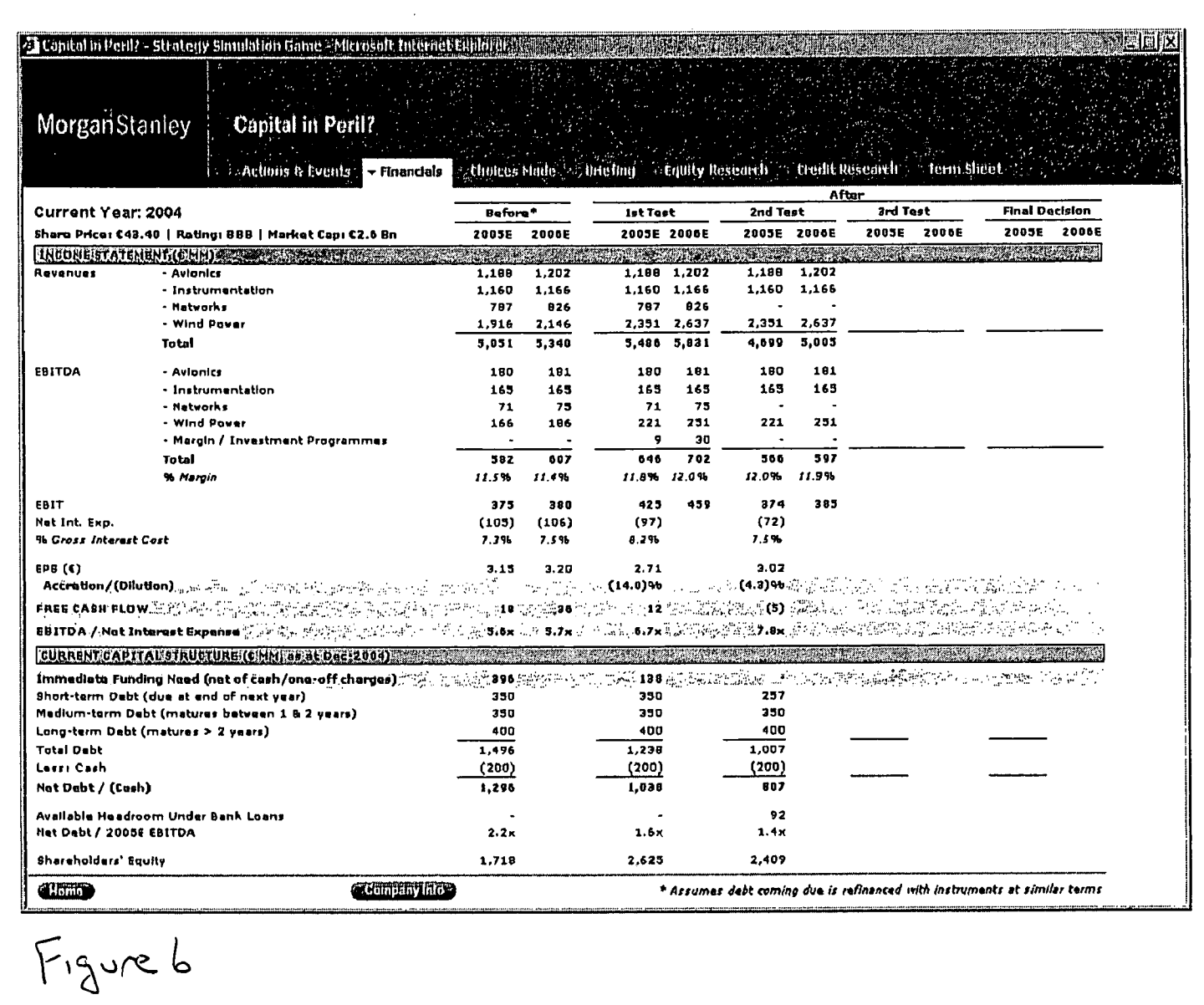

FIG. 6 shows the financials after the second set of test decisions has been implemented. The decisions chosen to generate the results were wind power acquisition, sell networks, and small equity issue. At this point of the simulation, the share price is frozen at 43.40 Euros and the credit rating is frozen at BBB.

Figure 7:
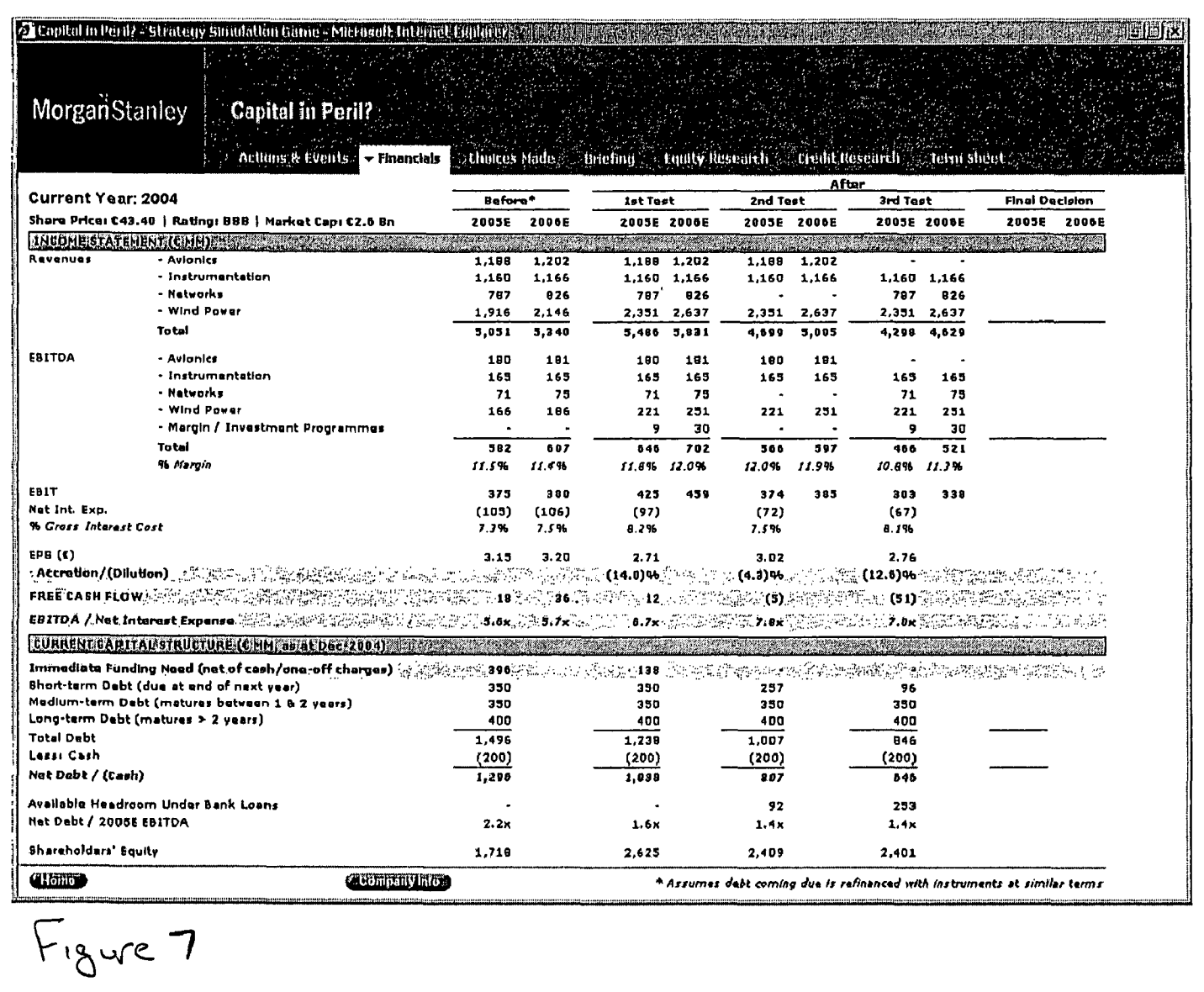

FIG. 7 shows the financials after the third set of test decisions has been implemented. The decisions chosen to generate the results were wind power acquisition, investment program, and sell avionics. At this point of the simulation, the share price is frozen at 43.40 Euros and the credit rating is frozen at BBB.

Figure 8:
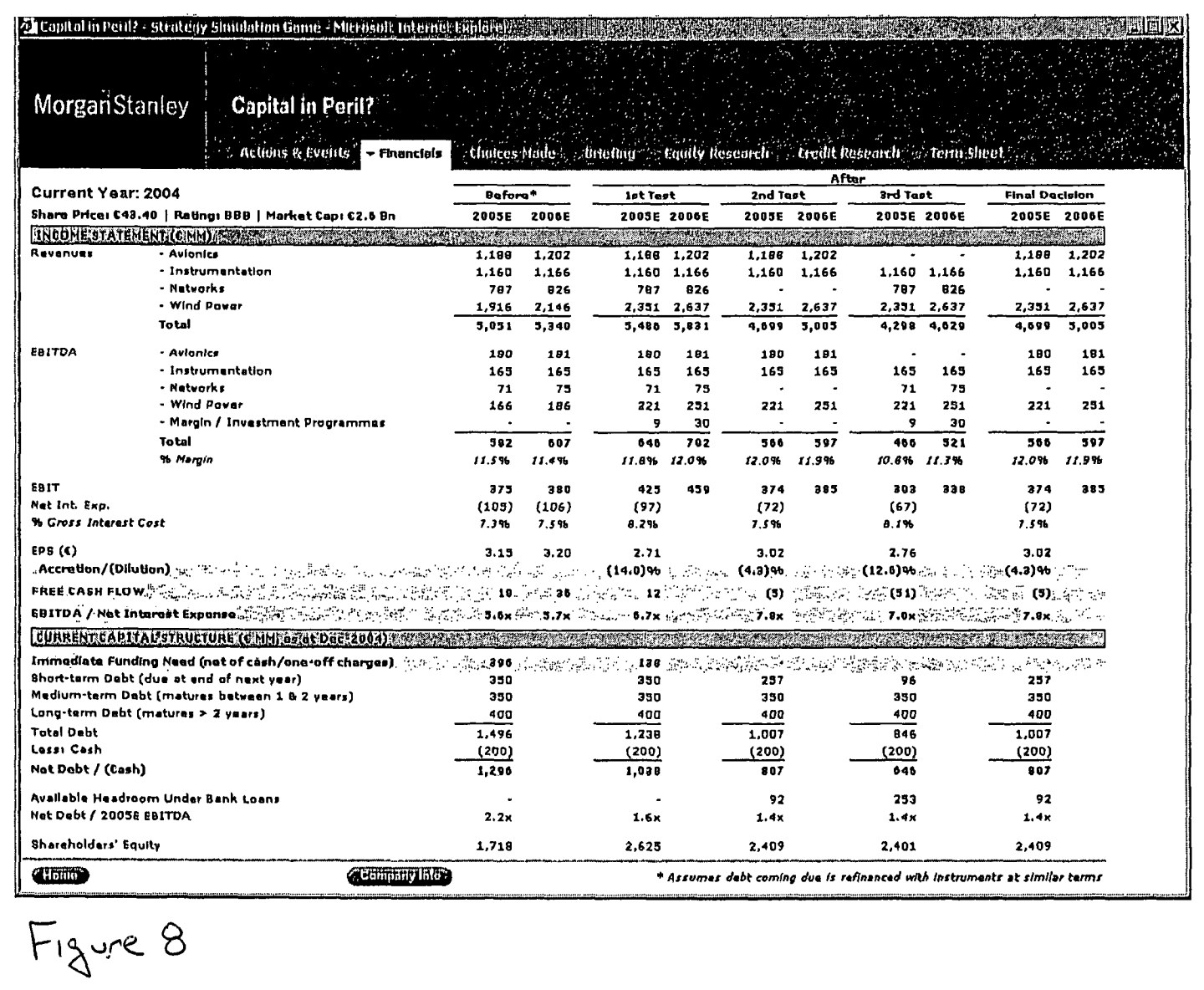

FIG. 8 shows the financials after the final set of decisions has been implemented. The decisions chosen to generate the results were wind power acquisition, sell networks, and small equity issue. At this point of the simulation, the second period has not yet started, the share price is frozen at 43.40 Euros, and the credit rating is frozen at BBB.

Figure 9:
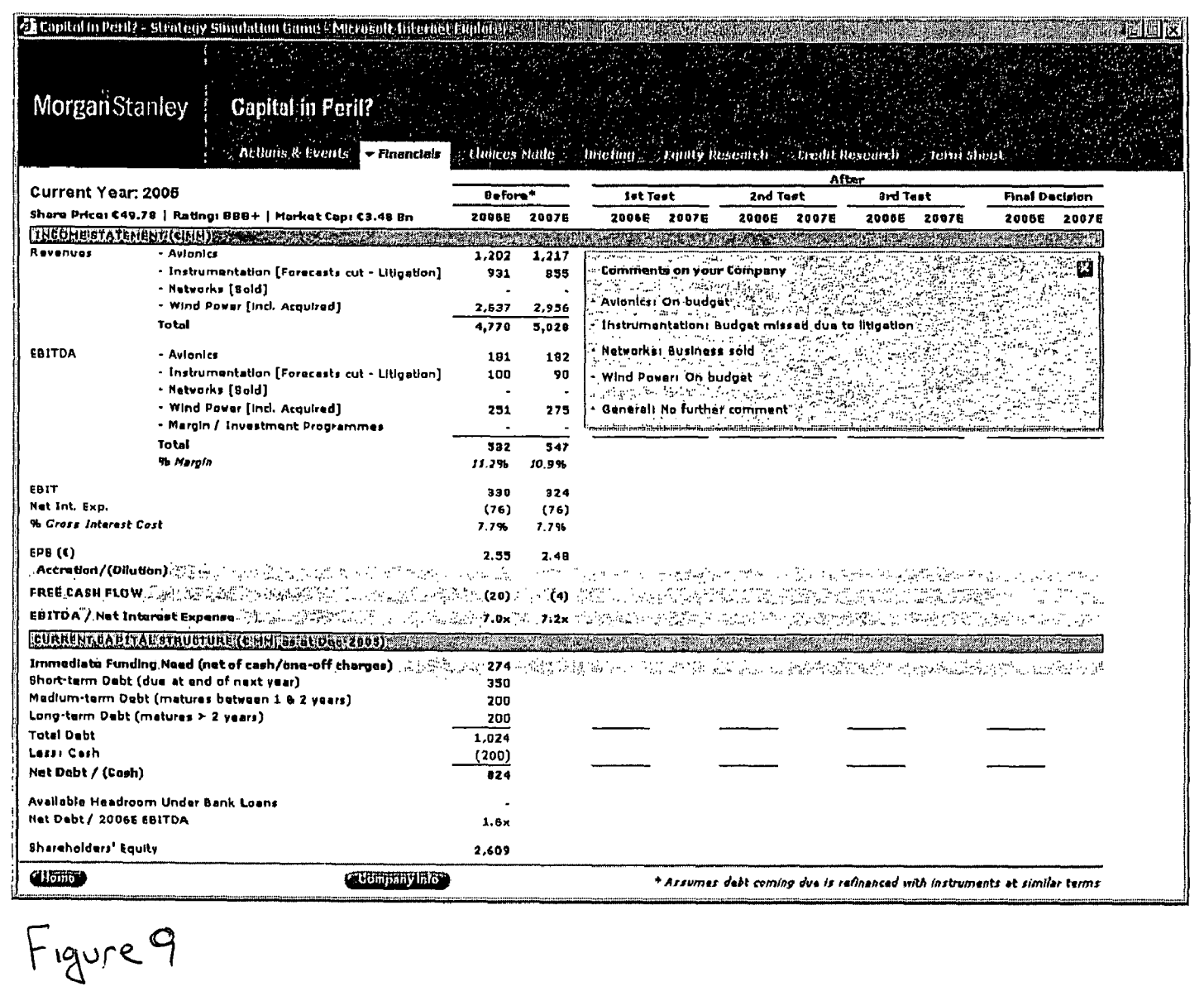

FIG. 9 shows the financials at the start of the second period of the simulation. At this point of the simulation, the share price has risen to 49.78 Euros, the credit rating has improved to BBB+, and the immediate funding requirements are 274 MM Euros.

Figure 10:
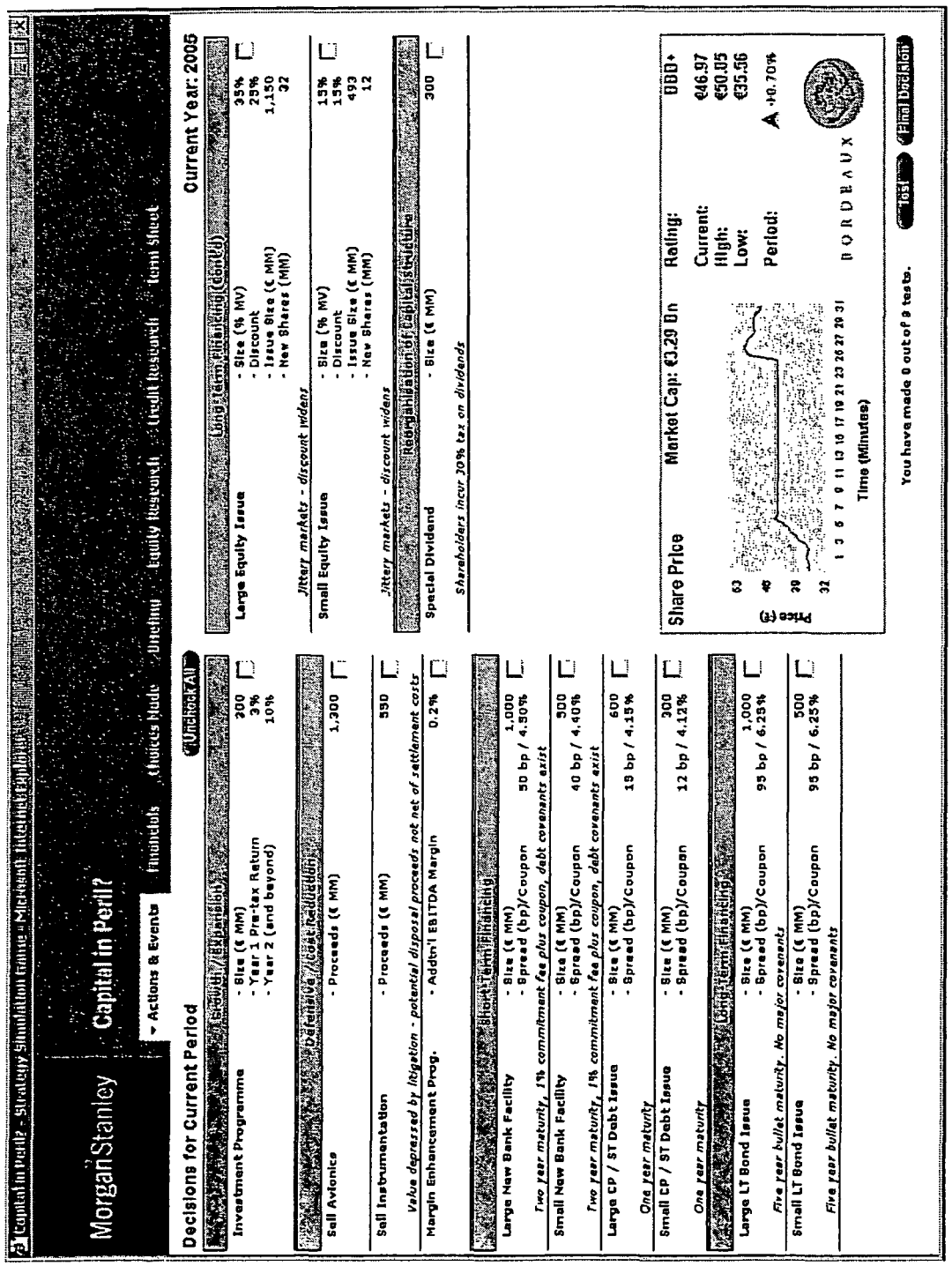

FIG. 10 shows the decisions available to the team as the second board meeting begins. Because of the final set of decisions implemented at the first board meeting, only thirteen decisions are available at the second board meeting. At this point of the simulation, the share price has fallen to 46.97 Euros and the credit rating is still BBB+.

Figure 11:
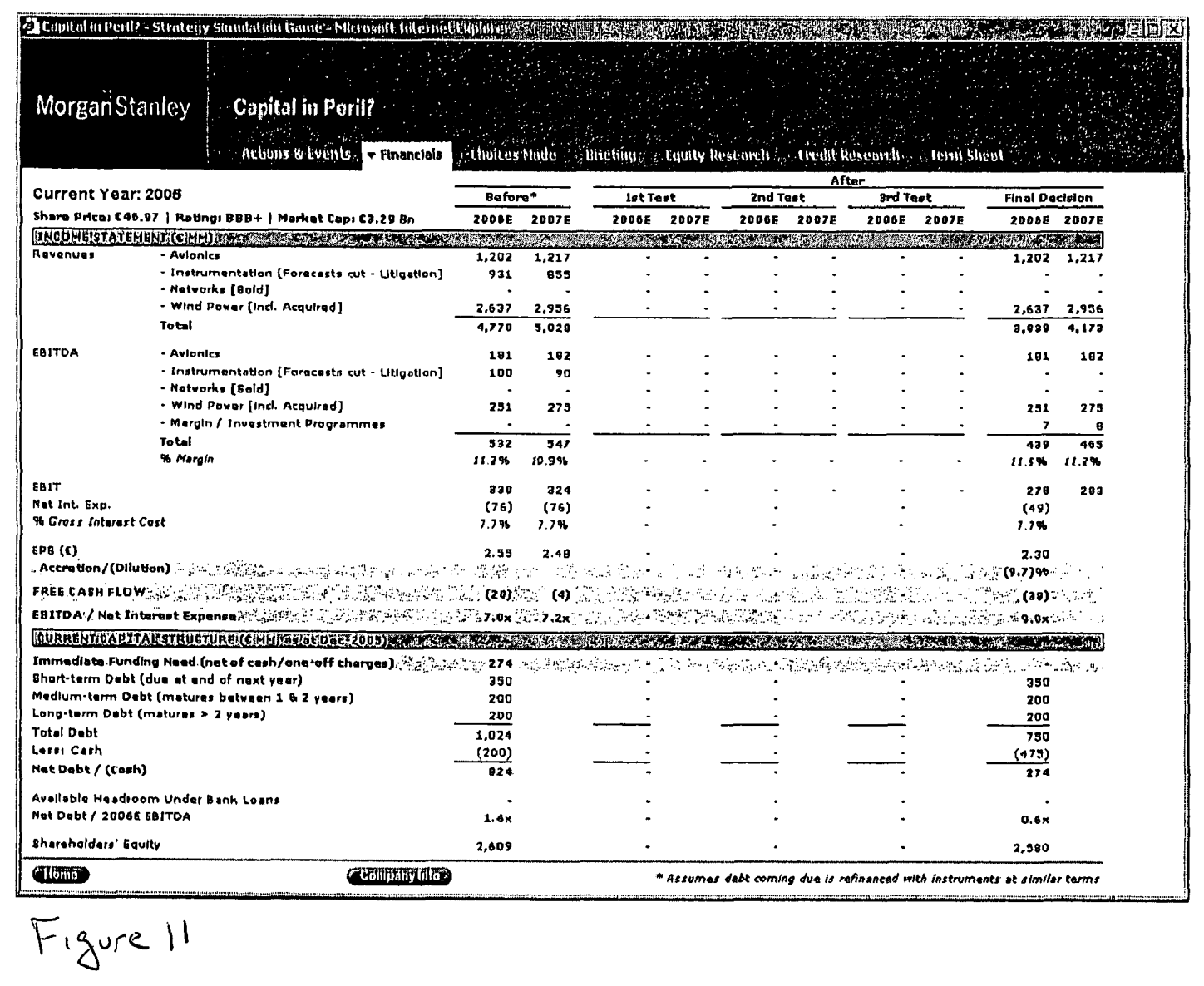

FIG. 11 shows the financials after the final set of decisions has been implemented for the second period. The decisions chosen to generate the results were sell instrumentation and margin enhancement. No test decisions were implemented at the second board meeting. At this point of the simulation, the third period has not yet started, the share price is frozen at 46.97 Euros, and the credit rating is frozen at BBB+.

Figure 12:
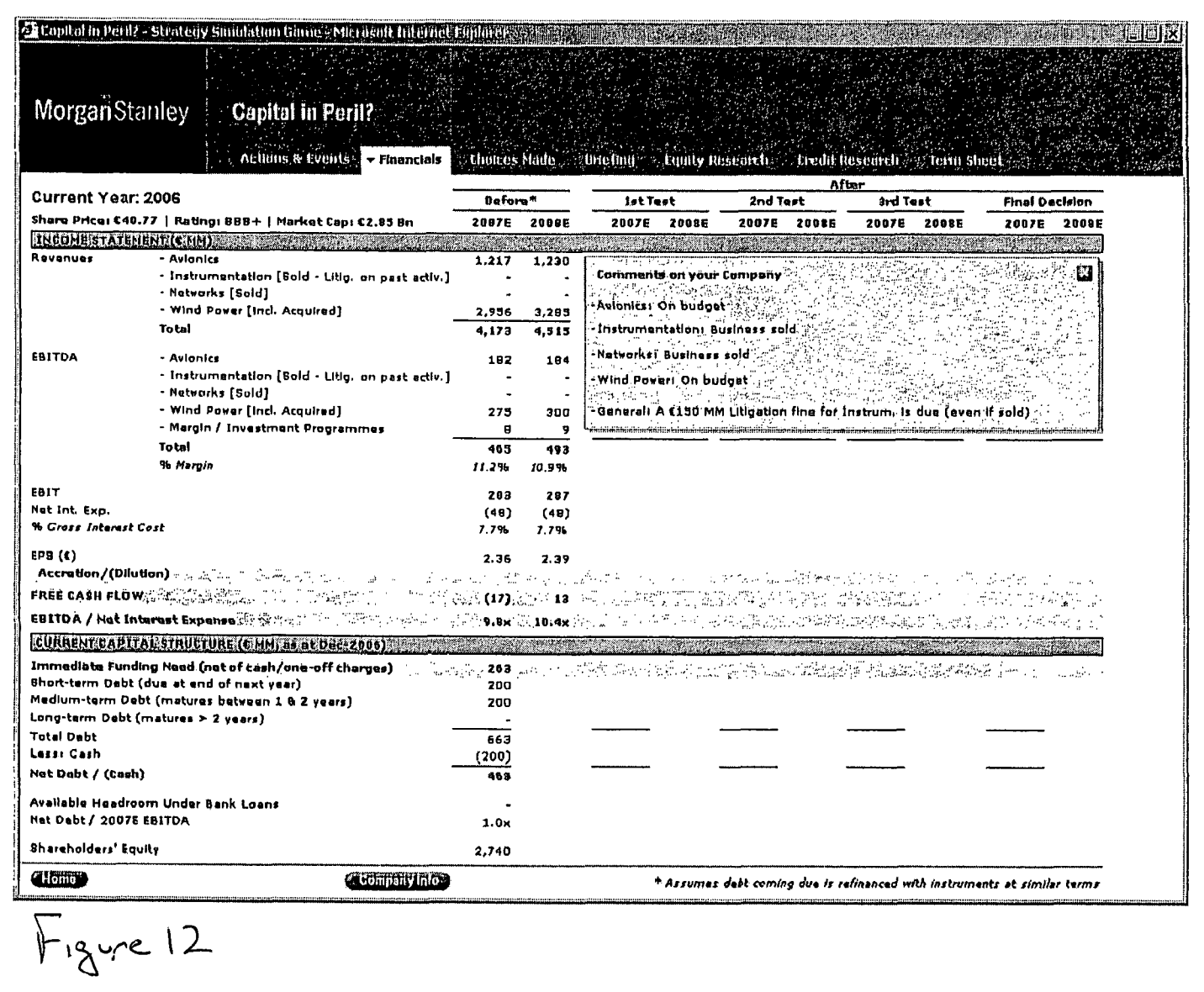

FIG. 12 shows the financials at the start of the third period of the simulation. At this point of the simulation, the share price has fallen to 40.77 Euros, the credit rating has remained at BBB+, and the immediate funding requirements are 263 MM Euros.

Figure 13:
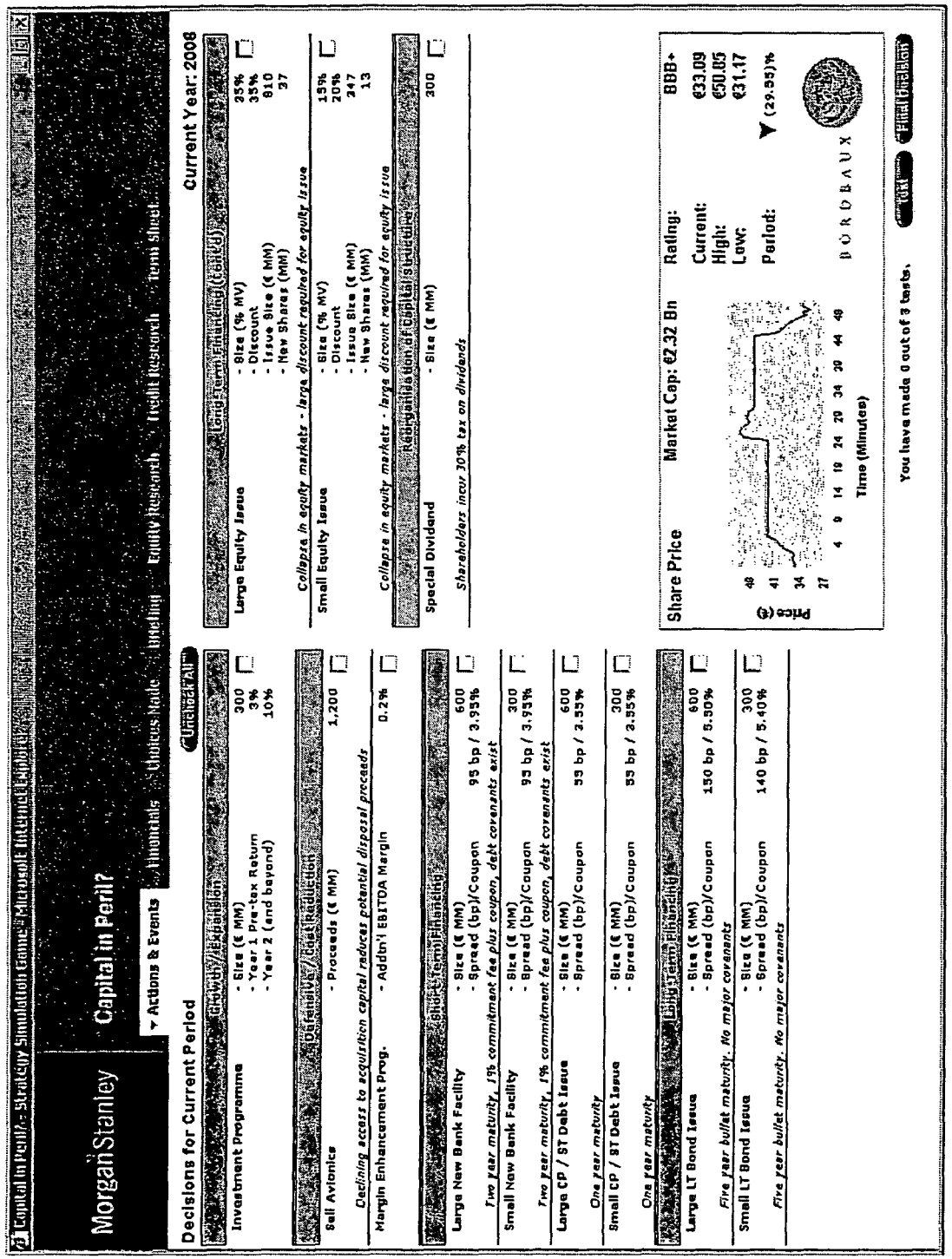

FIG. 13 shows the decisions available to the team as the third board meeting begins. Because of the final set of decisions implemented at the previous board meetings, only twelve decisions are available at the third board meeting. At this point of the simulation, the share price has fallen to 33.09 Euros and the credit rating is still BBB+.

FIG. 14 shows the financials after the first set of test decisions has been implemented at the third board meeting. The decisions chosen to generate the results were small long-term bond issue and margin enhancement. At this point of the simulation, the share price is frozen at 33.09 Euros and the credit rating is frozen at BBB+.

Figure 15:
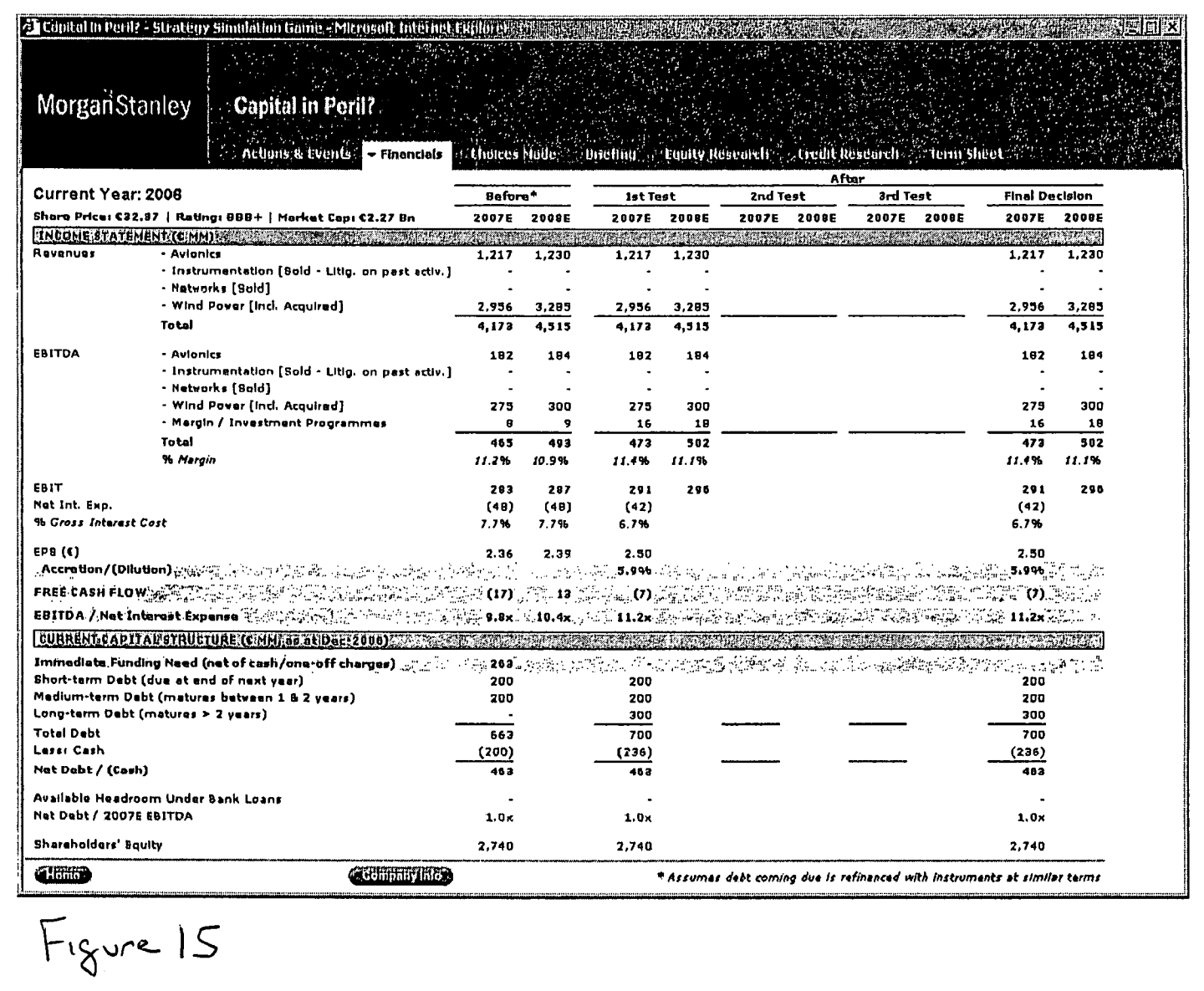

FIG. 15 shows the financials after the final set of decisions has been implemented for the third period. The decisions chosen to generate the results were small long-term bond issue and margin enhancement. A second and third set of test decisions were not implemented at the third board meeting. At this point of the simulation, the fourth period has not yet started, the share price is frozen at 33.09 Euros, and the credit rating is frozen at BBB+.

Figure 16:
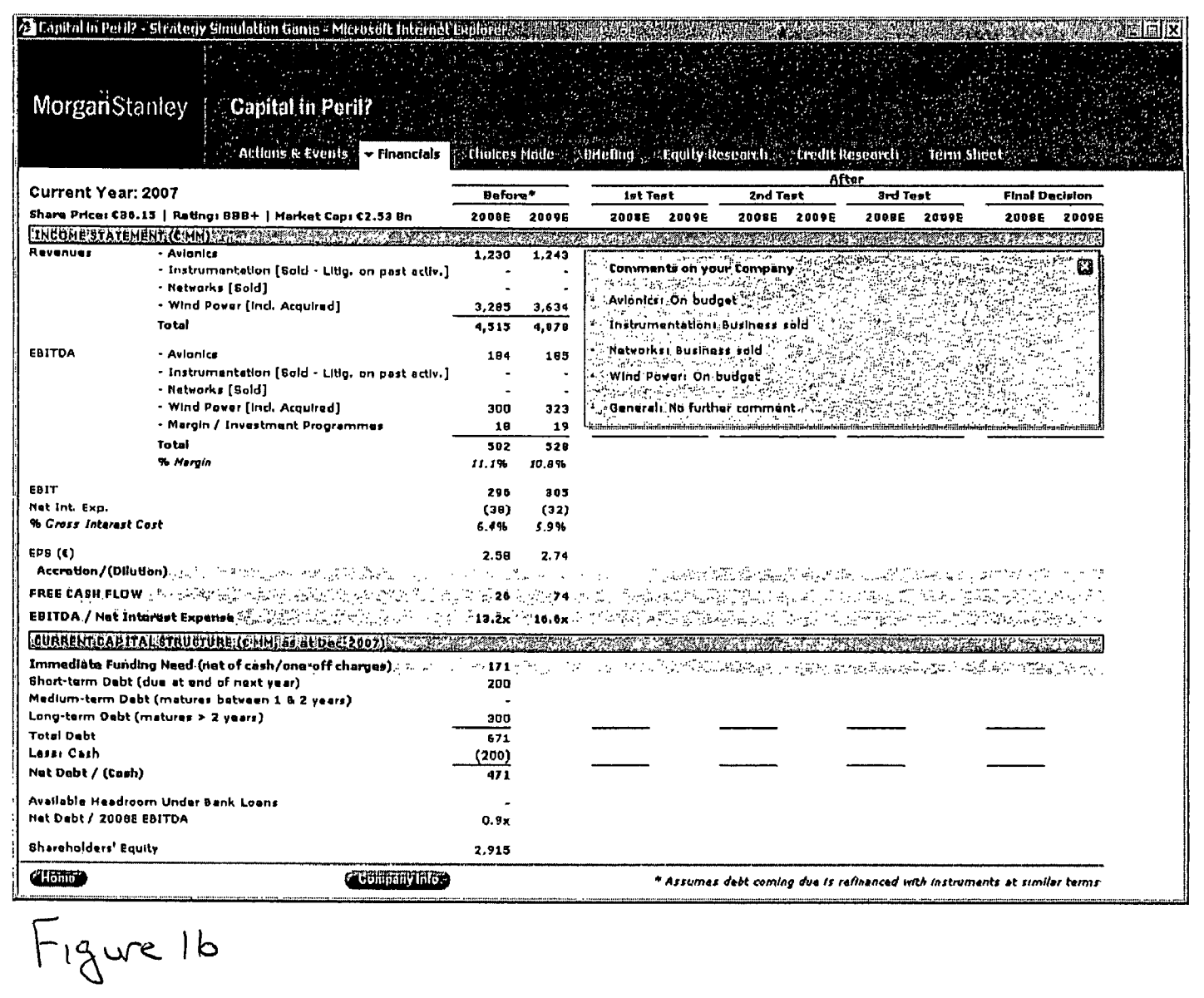

FIG. 16 shows the financials at the start of the fourth period of the simulation. At this point of the simulation, the share price has risen to 36.15 Euros, the credit rating has remained at BBB+, and the immediate funding requirements are 171 MM Euros.

Figure 17:
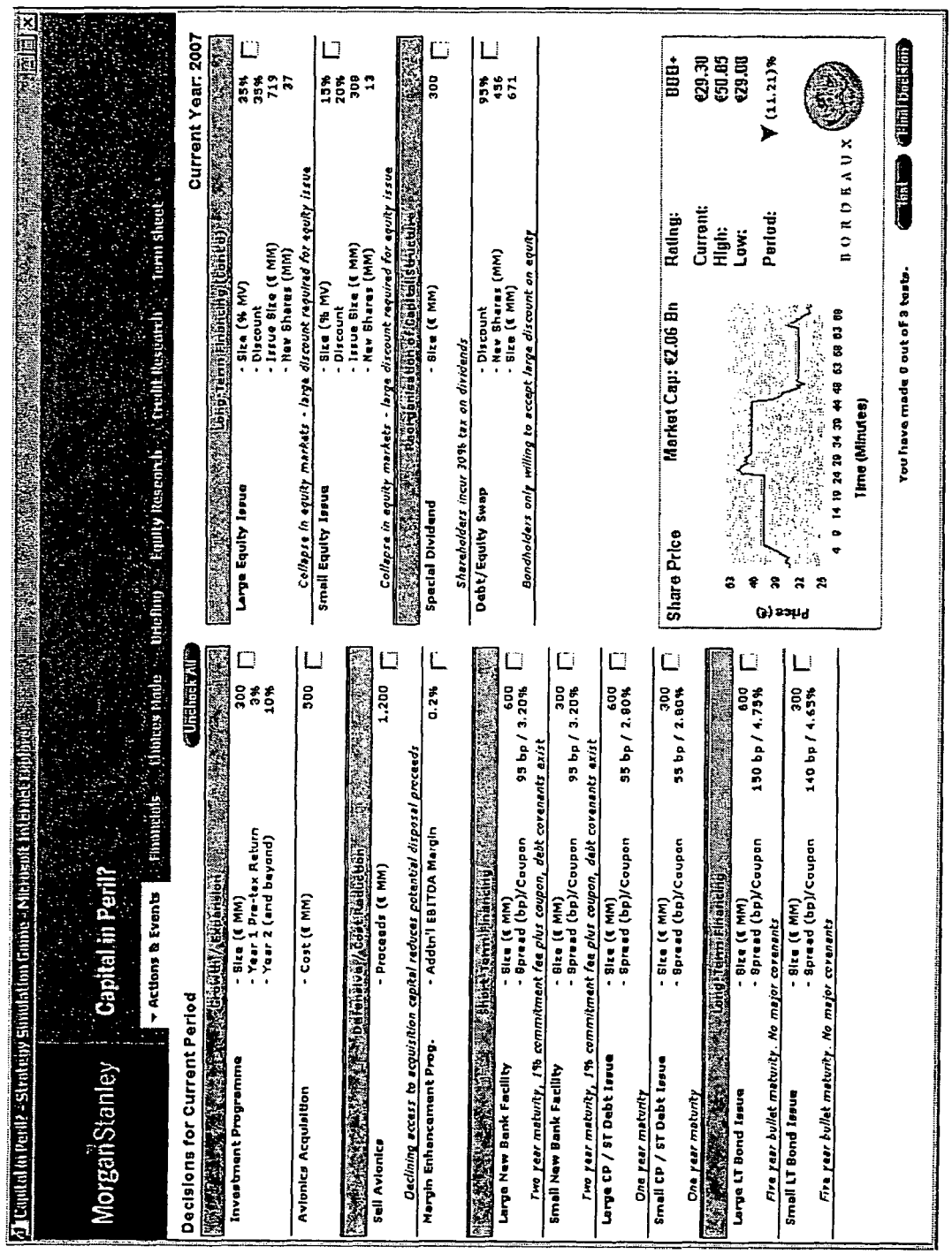

FIG. 17 shows the decisions available to the team as the fourth board meeting begins. Because of the final set of decisions implemented at the previous board meetings, only fourteen decisions are available at the fourth board meeting. At this point of the simulation, the share price has fallen to 29.38 Euros and the credit rating is still BBB+.

Figure 18:
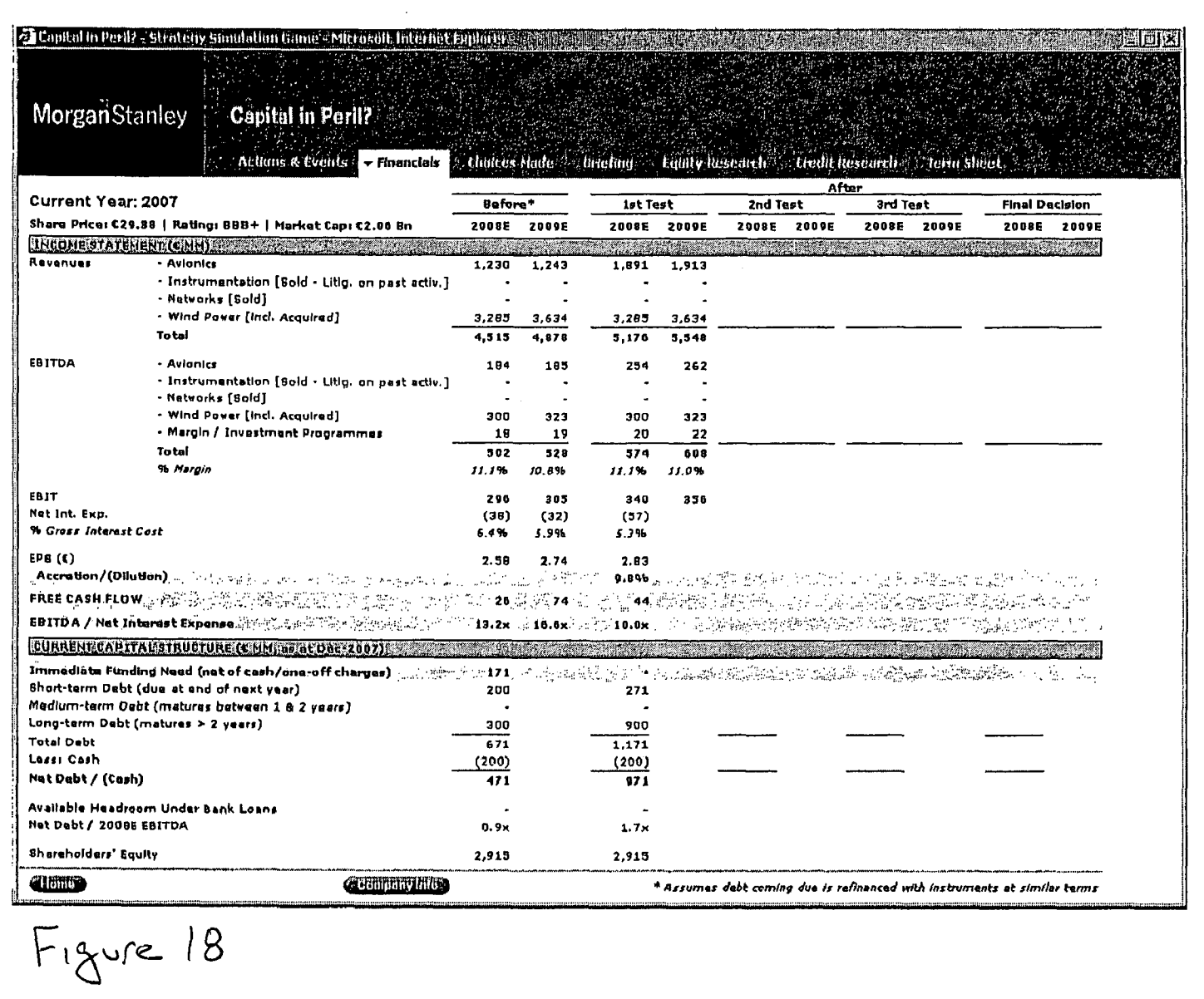

FIG. 18 shows the financials after the first set of test decisions has been implemented at the fourth board meeting. The decisions chosen to generate the results were avionics acquisition, small commercial paper/short-term debt issue, and large long-term bond issue. At this point of the simulation, the share price is frozen at 29.38 Euros and the credit rating is frozen at BBB+.

Figure 19:
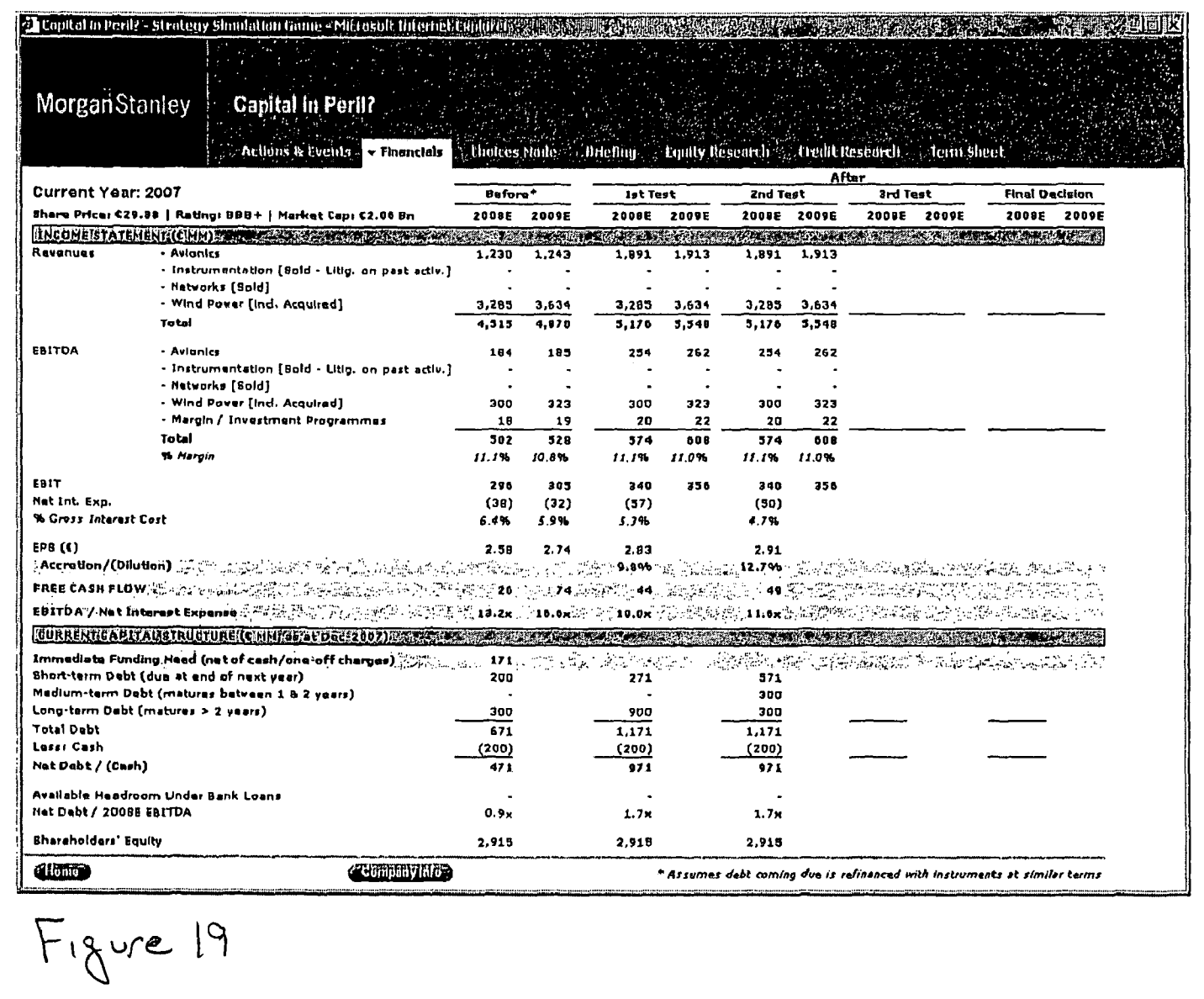

FIG. 19 shows the financials after the second set of test decisions has been implemented. The decisions chosen to generate the results were avionics acquisition, small new bank facility, and large commercial paper/short-term debt issue. At this point of the simulation, the share price is frozen at 29.38 Euros and the credit rating is frozen at BBB+.

Figure 20:
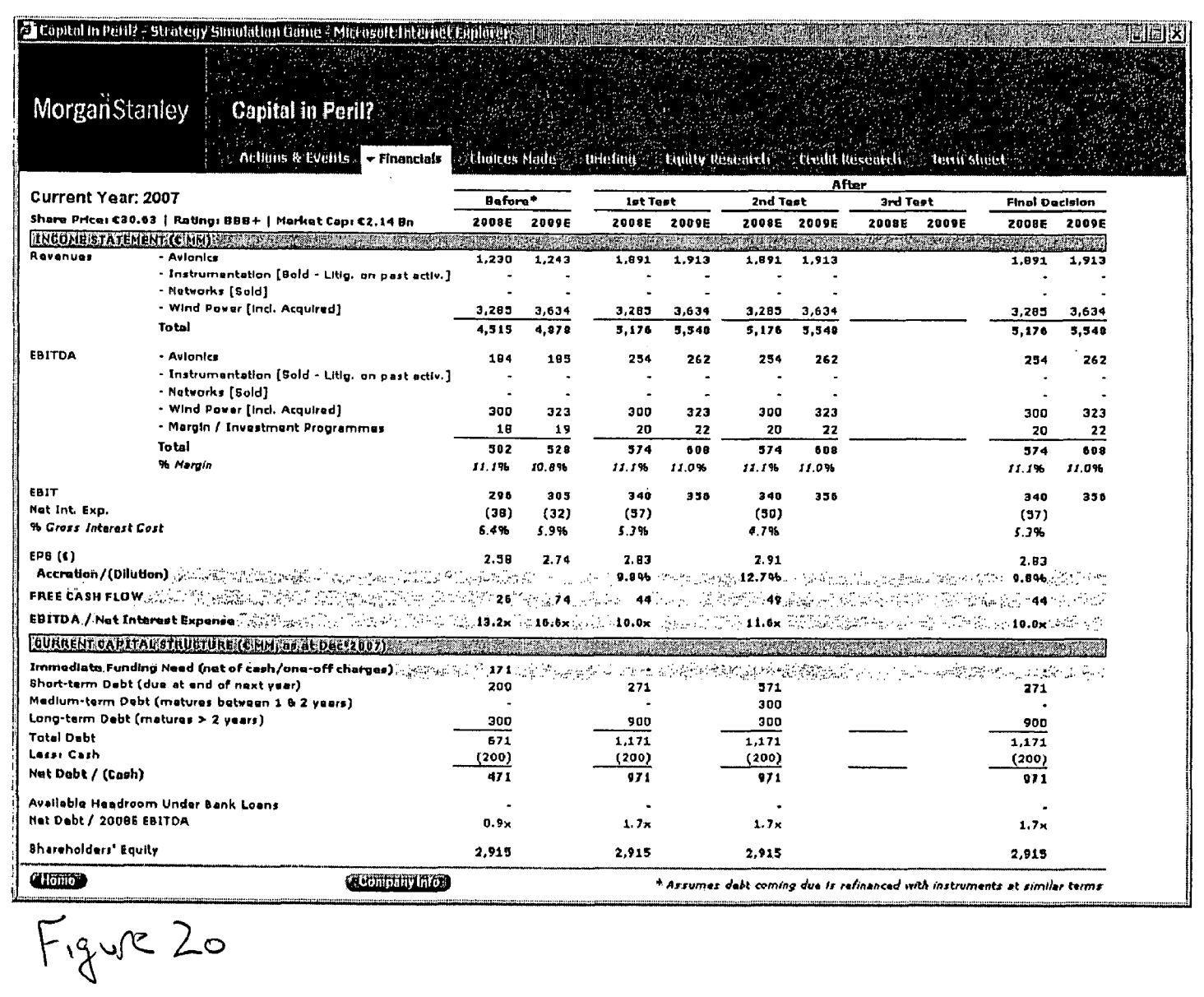

FIG. 20 shows the financials after the final set of decisions has been implemented for the fourth period. The decisions chosen to generate the results were avionics acquisition, small commercial paper/short-term debt issue, and large long-term bond issue. A third set of test decisions was not implemented at the fourth board meeting. At this point of the simulation, the fifth period has not yet started, the share price is frozen at 29.38 Euros, and the credit rating is frozen at BBB+.

Figure 21:
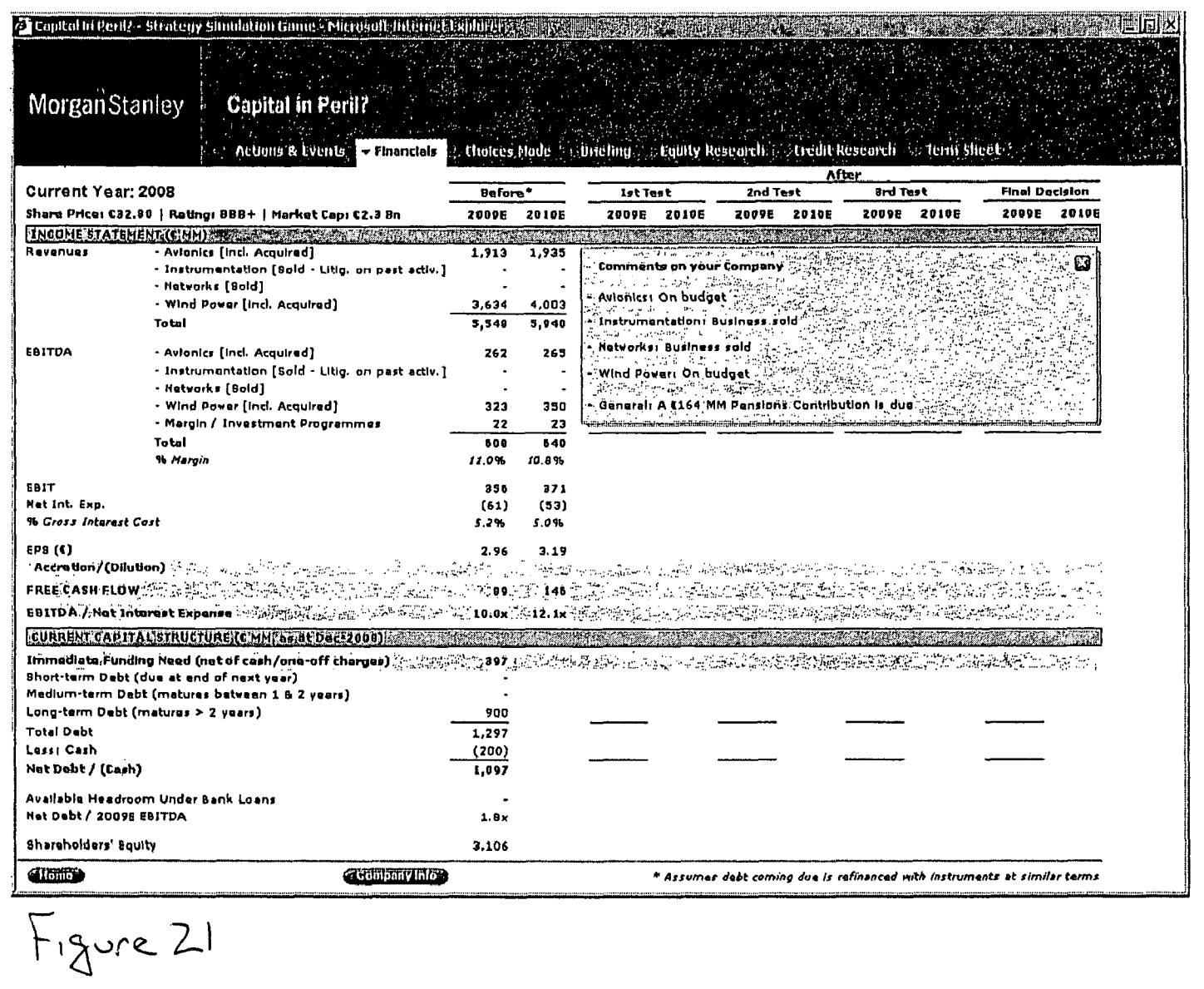

FIG. 21 shows the financials at the start of the fifth period of the simulation. At this point of the simulation, the share price has risen to 32.80 Euros, the credit rating has remained at BBB+, and the immediate funding requirements are 397 MM Euros.

Figure 22:
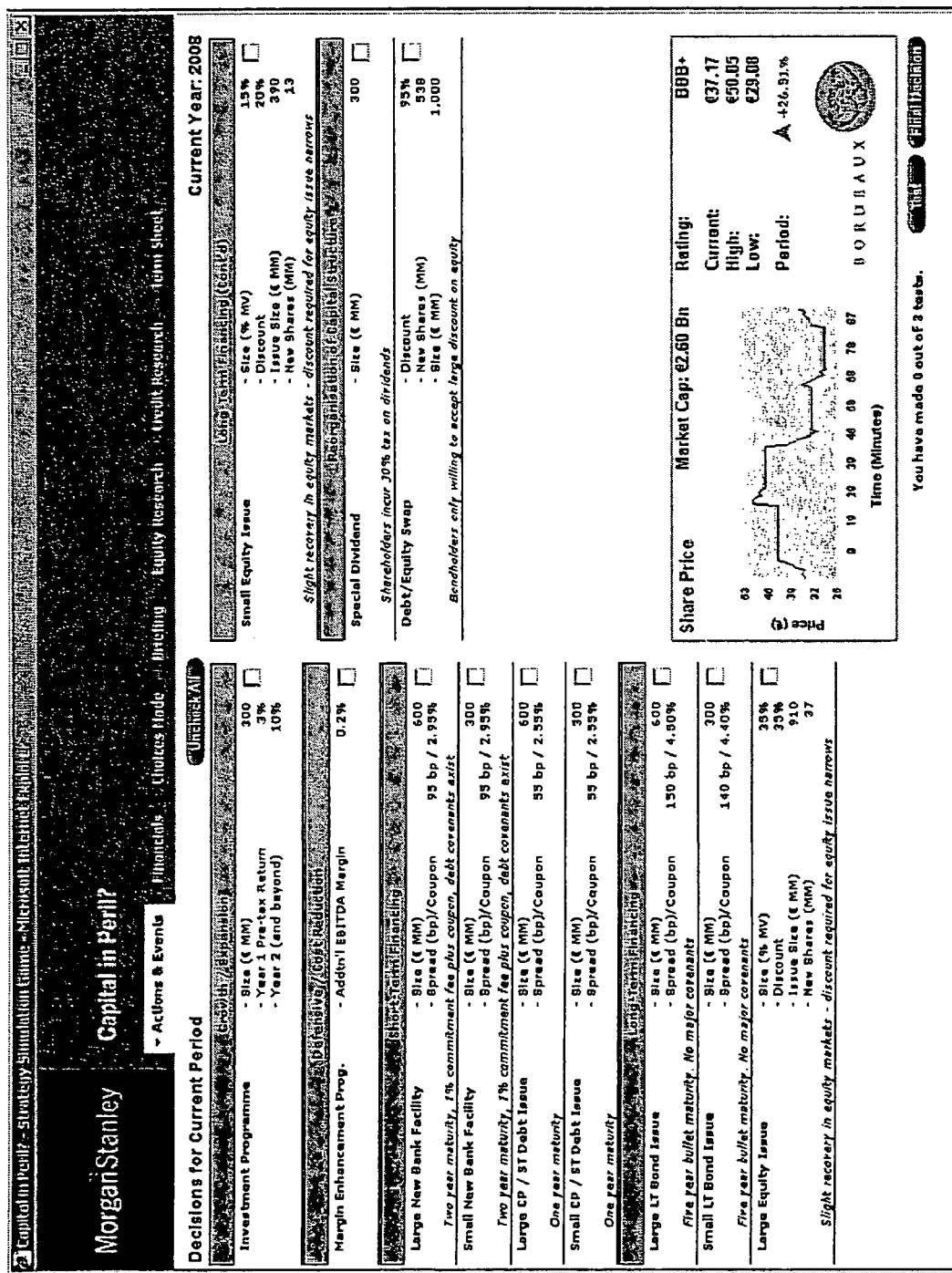

FIG. 22 shows the decisions available to the team as the fifth board meeting begins. Because of the final set of decisions implemented at the previous board meetings, only twelve decisions are available at the fifth board meeting. At this point of the simulation, the share price has risen to 37.17 Euros and the credit rating is still BBB+.

Figure 23:
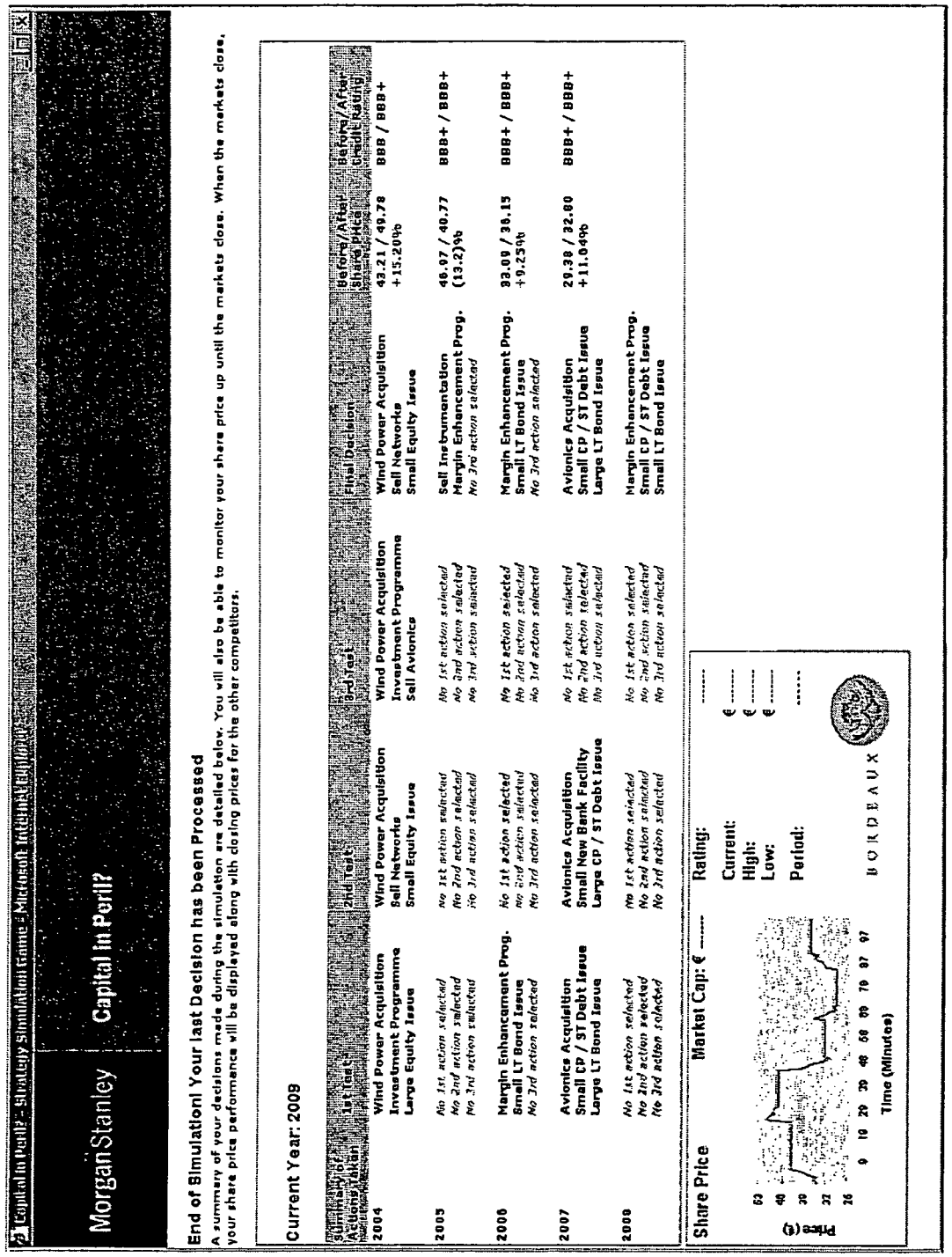

FIG. 23 shows the summary after the final set of decisions has been implemented for the fifth period. The decisions chosen to generate the results were margin enhancement, small commercial paper/short-term debt issue, and small long-term bond issue. No test decisions were implemented at the fifth board meeting. At this point of the simulation, the financials are not shown. The final share price, credit rating and market cap are presented when the final standings of the teams are announced.

Figure 24:
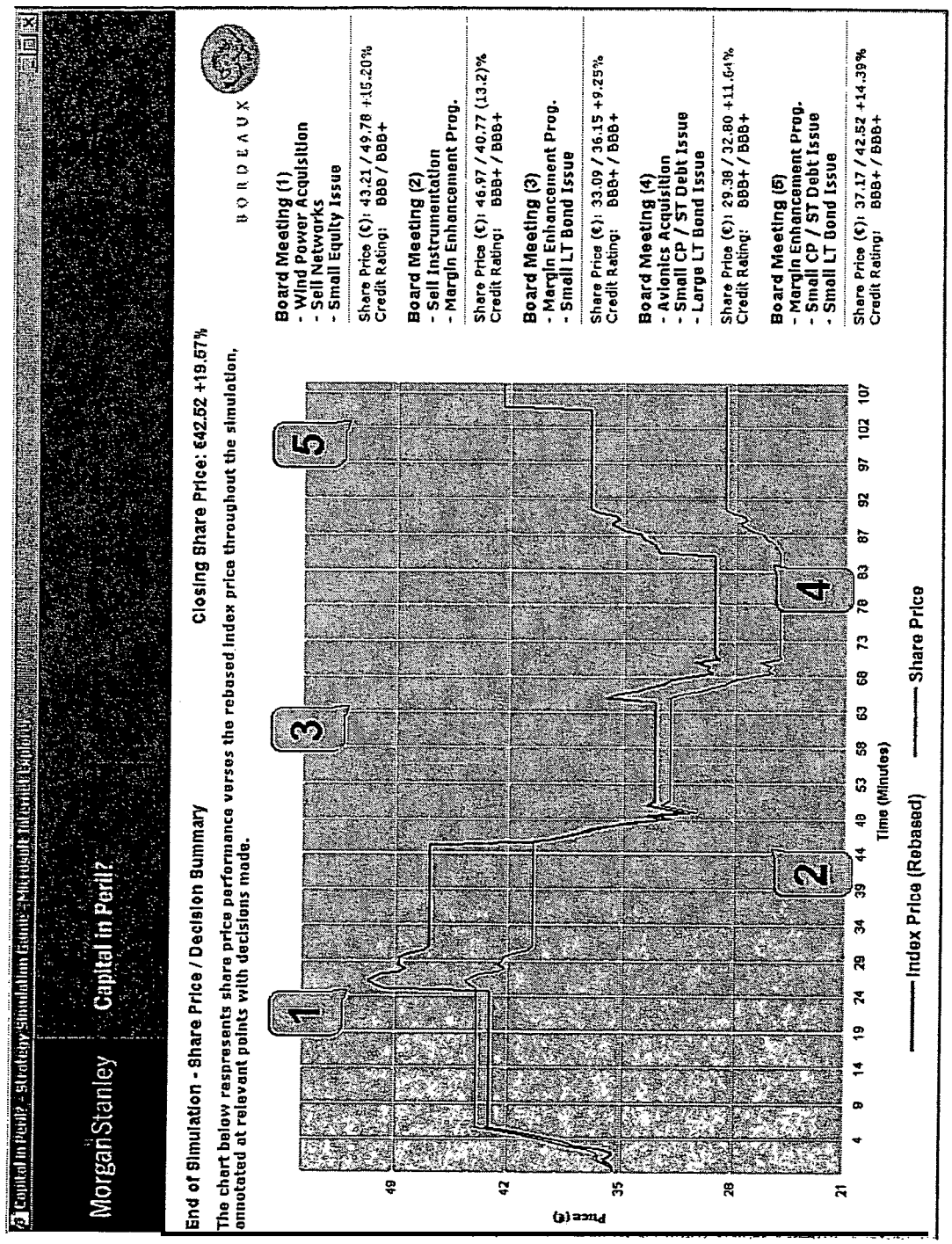

FIG. 24 shows an alternate embodiment of the summary after the final set of decisions has been implemented for the fifth period. The decisions chosen to generate the results were margin enhancement, small commercial paper/short-term debt issue, and small long-term bond issue. No test decisions were implemented at the fifth board meeting. The final share price is displayed at the top and in the lower right corner. The final credit rating is also displayed in the lower right corner.

While several embodiments of the disclosed invention have been described, it should be apparent, however, that various modifications, alterations and adaptations to those embodiments may occur to persons skilled in the art with the attainment of some or all of the advantages of the disclosed invention. For example, according to various embodiments, the company may include more than or less than four divisions, the simulation may include more than or less than five periods, the credit rating may change throughout each period and the teams may interact with each other.

According to various embodiments, there may be any number of different decisions available at the various board meetings, and the available decisions may be other than those described herein. For example, the decisions may include a short-term hedging action, a long-term hedging action, a short-term convertible debt issuance and a long-term convertible debt issuance.

According to various embodiments, the financial model may employ a spreadsheet other than an Excel spreadsheet, and the fluctuations of Euribor and the industry index may be dynamic rather than pre-set. In addition, it is understood that the financial model described herein may be used to simulate any type of financial action that may be taken by a company.

According to various embodiments, the simulation currency may be a currency other than the Euro. For example, the currency may be the U.S. dollar, the British pound, the French franc, the Japanese yen, etc.

According to various embodiments, an action carried out by one team may affect the other teams. The simulation may include an auction element for acquisitions or disposals of divisions so that teams could bid for acquisitions, with only the highest bidders (e.g., top 30%) actually succeeding with their bid.

According to various embodiments, the divisional/financial make up of the fictitious company may be tailored towards a specific industry (e.g., pharmaceuticals) or even a specific client.

According to various embodiments, the simulation content may be presented in a language other than English. For example, the simulation content may be presented in French, German, Russian, Japanese, etc.

It is therefore intended to cover all such modifications, alterations and adaptations without departing from the scope and spirit of the disclosed invention as defined by the appended claims.

What is claimed is:

1. A computer-implemented method for conducting a multi-round interactive financial simulation involving a plurality of participants, wherein each participant is assigned and makes decisions for a separate fictitious company, the method comprising:

for each round of the multi-round interactive financial simulation:
transmitting, by each participant, to a computer system, one or more company strategy decisions for the fictitious company of the participant from a finite list of company strategy decision options presented to each participant by the computer system, wherein the participants have an allotted time to make the one or more company strategy decisions for the fictitious company of the participant, and if a participant does not transmit the one or more company strategy decisions to the computer system within the allotted time, the computer system deems the participant's one or more company strategy decisions to be no changes in company strategy for the fictitious company of the participant, wherein each participant is provided prior to transmitting the one or more company strategy decisions background information for the multi-round interactive financial simulation, wherein the background information comprises information about the fictitious company of the participant and an initial set of conditions for the fictitious company of the participant, wherein the initial set of conditions are the same for each participant, and wherein the initial set of conditions comprise an initial share price for the fictitious company of the participant, an initial credit rating for the fictitious company of the participant, an initial market capitalization for the fictitious company of the participant, and initial funding requirements for the fictitious company of the participant;

displaying, on a display in communication with the computer system, at least one news story to each of the participants simultaneously;

determining, by the computer system, a new share price and a new credit rating for each company based on factors that comprise a fluctuating market index and the one or more company strategy decisions of the participants, wherein fluctuations of the fluctuating market index are related to the at least one new story, wherein the new share price and new credit rating for each company are determined by the computer system using a financial model that assigns one or more scores to the participants based on the one or more company strategy decisions of the participants; and displaying, on the display, the new share price for each of the fictitious companies, wherein a winner of the multi-round interactive financial simulation is the participant whose fictitious company has the greatest share price following a final round of the multi-round interactive financial simulation.

2. The method of claim 1, wherein the initial set of conditions further comprises:
a projected income statement; and
an initial capital structure.

3. The method of claim 2, wherein the projected income statement for each participant's fictitious company comprises:
revenues for one or more divisions of each participant's fictitious company;
earnings before interest, depreciation, tax and amortization for each division of each participant's fictitious company;
earnings before interest and tax;
net interest expense;
earnings per share; and
free cash flow.

4. The method of claim 1, wherein displaying the at least one news story comprises displaying at least one of the following:
a business news story;
an economic news story;
a legal news story;
a legislative news story;
a political news story; and
a sports news story.

5. The method of claim 1, wherein the one or more scores assigned to the participants for the financial model comprises:
a strategy score; and
a credit score.

6. The method of claim 1, wherein, subsequent to a first round of the simulation, the computer system determines the list of company strategy decision options for the fictitious companies based on prior decisions for the fictitious companies.

7. The method of claim 1, further comprising, for each round of the multi-round interactive financial simulation, determining by the computer system a new financial projection for each fictitious company that comprises:
a revised projected income statement; and
a revised year-end capital structure.

8. The method of claim 1, wherein the one or more scores assigned to the participants for the financial model comprises a company strategy score and a capital structure score.

9. The method of claim 1, wherein the finite list of company strategy decision options comprise:
one or more company growth/expansion strategy options;
one or more defensive/cost reduction strategy options;
one or more short term financing strategy options;
one or more long term financing strategy options; and
one or more capital structure reorganization strategy options.

10. The method of claim 1, further comprising, in at least one round of the multi-round interactive financial simulation, prior to transmitting the one or more company strategy decisions to the computer system:
making, by a participant, one or more test company strategy decisions; and
receiving, by the participant, from the computer system, simulation results based on the one or more test company strategy decisions.

11. The method of claim 1, wherein providing the background information to the participants comprises displaying the initial set of conditions on the display.

12. The method of claim 1, wherein displaying, on the display, the new share price for each of the fictitious companies further comprises displaying on the display the new credit rating for each of the fictitious companies.

13. The method of claim 1, further comprising displaying, on the display, the fluctuating market index.

14. The method of claim 13, wherein, for each round of the multi-round interactive financial simulation, prior to transmitting the one or more company strategy decisions, conducting, by each participant, a board meeting for the participant's fictitious company, wherein the index does not fluctuate during the board meeting.

15. The method of claim 1, wherein the multi-round interactive financial simulation comprises at least a first round and a second round, wherein the allotted time to make the one or more company strategy decisions in the first round is greater than the allotted time to make the one or more company strategy decisions in the second round.

16. The method of claim 1, wherein, for rounds after a first round of the multi-round simulation, the finite list of company strategy decision options presented to each participant by the computer system is based on prior company decisions made by each participant, such that when two participants make different company strategy decisions in the first round, the two participants' finite list of company strategy decisions options are different for rounds after the first round.

17. The method of claim 16, further comprising displaying, on the display, the fluctuating market index.

18. The method of claim 17, wherein, for each round of the simulation, prior to transmitting the one or more company strategy decisions, conducting, by each participant, a board meeting for their respective companies, wherein the index does not fluctuate during the board meeting.

19. The method of claim 18, wherein the one or more scores assigned to the participants for the financial model comprises a company strategy score and a capital structure score.

20. The method of claim 19, wherein the list of company strategy decision options comprise:
- one or more company growth/expansion strategy options;
- one or more defensive/cost reduction strategy options;
- one or more short term financing strategy options;
- one or more long term financing strategy options; and
- one or more capital structure reorganization strategy options.

21. The method of claim 20, further comprising, in at least one round of the multi-round interactive financial simulation, prior to transmitting the one or more company strategy decisions to the computer system:
- making, by a participant, one or more test company strategy decisions; and
- receiving, by the participant, from the computer system, simulation results based on the one or more test company strategy decisions.

* * * * *